United States Patent
Yamamoto

(10) Patent No.: US 7,506,008 B2
(45) Date of Patent: Mar. 17, 2009

(54) STORAGE APPARATUS, STORAGE CONTROL METHOD, AND COMPUTER PRODUCT

(75) Inventor: Kazuhiko Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 11/017,972

(22) Filed: Dec. 22, 2004

(65) Prior Publication Data

US 2006/0064441 A1 Mar. 23, 2006

(30) Foreign Application Priority Data

Sep. 22, 2004 (JP) ............................. 2004-275138

(51) Int. Cl.
*G06F 17/30* (2006.01)
*G06F 7/00* (2006.01)

(52) U.S. Cl. .......................................... 707/204; 707/10

(58) Field of Classification Search .................. 707/204
See application file for complete search history.

(56) References Cited

U.S. PATENT DOCUMENTS

| | | | | |
|---|---|---|---|---|
| 6,366,987 B1 * | 4/2002 | Tzelnic et al. | ............... | 711/162 |
| 7,111,138 B2 * | 9/2006 | Higaki et al. | ............... | 711/162 |
| 7,130,974 B2 * | 10/2006 | Iwamura et al. | ............. | 711/162 |
| 7,149,787 B1 * | 12/2006 | Mutalik et al. | ............... | 709/217 |
| 2003/0005248 A1 * | 1/2003 | Selkirk et al. | ................ | 711/165 |
| 2004/0054963 A1 * | 3/2004 | Kobayashi et al. | ........... | 715/500 |
| 2004/0172509 A1 * | 9/2004 | Takeda et al. | ................ | 711/162 |
| 2004/0254964 A1 * | 12/2004 | Kodama et al. | ............. | 707/204 |
| 2004/0260874 A1 * | 12/2004 | Mori et al. | .................... | 711/114 |
| 2005/0038968 A1 * | 2/2005 | Iwamura et al. | ............. | 711/162 |
| 2005/0060506 A1 * | 3/2005 | Higaki et al. | ................ | 711/162 |

FOREIGN PATENT DOCUMENTS

| | | |
|---|---|---|
| JP | 9-6541 | 1/1997 |
| JP | 2000-163298 | 6/2000 |
| JP | 2001-222450 | 8/2001 |
| JP | 2003-296152 | 10/2003 |

* cited by examiner

*Primary Examiner*—Kuen S Lu
(74) *Attorney, Agent, or Firm*—Staas & Halsey LLP

(57) ABSTRACT

A storage apparatus includes a primary storage unit that stores data received from a host computer in a first storage area; a secondary storage unit that stores the data stored in the first storage area in a second storage area; a virtual-storage-area setting unit that logically combines the first storage area and the second storage area to set a plurality of virtual storage areas; and a data-storage control unit that controls data storage in such a manner that the data stored in the first storage area that belongs to a predetermined virtual storage area is stored in the second storage area that belongs to the predetermined virtual storage area.

20 Claims, 13 Drawing Sheets

FIG.4

PRIMARY STORAGE MAPPING TABLE
214a

| VIRTUAL DISK NUMBER | VIRTUAL DISK LOGICAL BLOCK ADDRESS | LOGICAL UNIT NUMBER | LOGICAL UNIT LOGICAL BLOCK ADDRESS | STATUS | LAST ACCESSED DATE |
|---|---|---|---|---|---|
| 0 | 2 | 4 | 24 | HIT | 2004/8/24 13:15:23 |
| 2 | 18 | 2 | 15 | HIT | 2004/8/24 15:47:09 |
| 1 | 11 | 3 | 6 | DIRTY | 2004/8/24 15:21:25 |
| 1 | 21 | 3 | 31 | MISS | 2004/8/24 15:52:14 |
| ... | ... | ... | ... | ... | ... |

FIG.5

SECONDARY STORAGE MAPPING TABLE
245a

| VIRTUAL DISK NUMBER | VIRTUAL DISK LOGICAL BLOCK ADDRESS | REMOVABLE MEDIA NUMBER | REMOVABLE MEDIA BLOCK NUMBER | LIBRARY NUMBER |
|---|---|---|---|---|
| 0 | 0 | 0 | 0 | 0 |
| | 1 | 0 | 1 | 0 |
| | 2 | 0 | 2 | 0 |
| | ... | ... | ... | ... |
| | 12 | 1 | 22 | 1 |
| | ... | ... | ... | ... |
| 1 | ... | ... | ... | ... |
| ... | ... | ... | ... | ... |

FIG.12

STORAGE CAPACITY DATA
1445b

| VIRTUAL DISK NUMBER | MAXIMUM STORAGE CAPACITY | DATA VOLUME |
|---|---|---|
| 0 | 512GB | 389GB |
| 1 | 1,024GB | 947GB |
| 2 | 768GB | 76.8GB |
| ... | ... | ... |

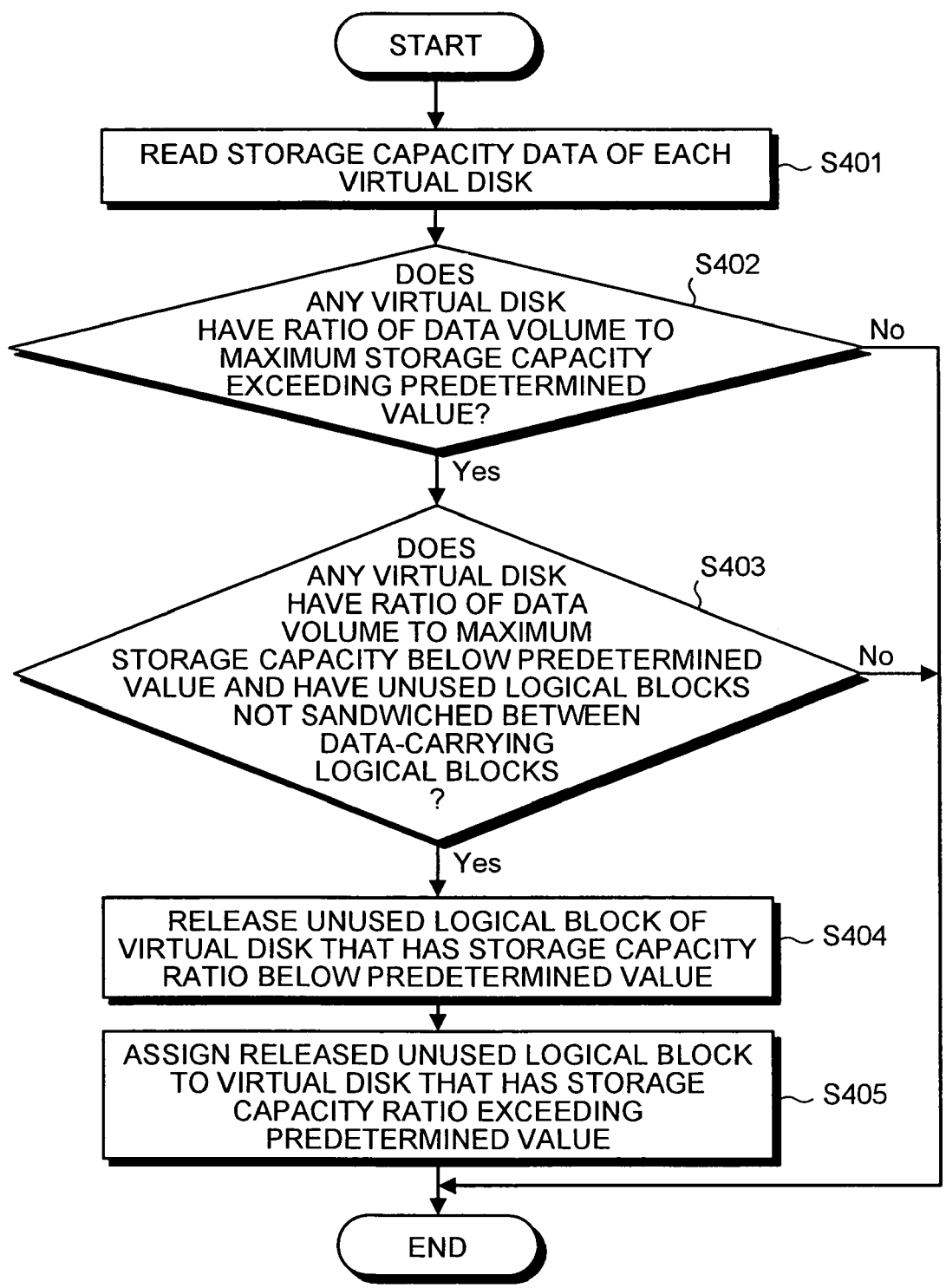

US 7,506,008 B2

STORAGE APPARATUS, STORAGE CONTROL METHOD, AND COMPUTER PRODUCT

BACKGROUND OF THE INVENTION

1) Field of the Invention

The present invention relates to a storage apparatus that includes a primary storage that stores in a predetermined storage area data received from a host computer and a secondary storage that stores in a predetermined area the data stored in the predetermined storage area in the primary storage, and that reads and sends to the host computer the requested data, upon receiving a read request to read the data stored in the secondary storage area from the host computer, as well as a storage control method and a storage control program that control the storage of the data in the storage apparatus. More particularly, the present invention relates to a storage apparatus, a storage control method, and a storage control program that enable easy and efficient management of various data stored in virtual storage areas.

2) Description of the Related Art

Hierarchical storage apparatuses have been used conventionally which involves storing data that is frequently referred by a host computer on a hard disk and data that is referred not very frequently on an optical disk or a magnetic tape.

A hard disk allows fast access to stored data and an optical disk or a magnetic tape allows large volumes of data to be stored. The advantages of the hard disk and the optical disk/magnetic tape are clubbed in the hierarchical storage apparatus which allows large volume of data to be accessed fast.

Upon receiving a read request from the host computer for the data stored on the optical disk/magnetic tape, the hierarchical storage apparatus reads the requested data from the optical disk/magnetic tape and stores it on the hard disk. The host computer then refers to the data stored on the hard disk.

Thus, to store data or read data, the host computer only needs to access the hard disk, obviating the need for the host computer to recognize the optical disk or the magnetic tape. Basically, the host computer uses the hard disk as a high-volume storage medium.

Japanese Patent Laid-Open Publication No. 2000-163298 and Japanese Patent Laid-Open Publication No. H9-6541 disclose hierarchical storage apparatuses in which the storage area of the hard disk and the storage area of the optical disk together form a logical drive, which the host computer recognizes as a single virtual storage area.

However, in the conventional hierarchical storage apparatus disclosed in the above literatures, the diverse data stored in the virtual storage area may get mixed up, making data management very difficult.

To be specific, when used by a plurality of users, the diverse data of the users may get mixed up, causing accidental deletion or overwriting of data of one user by another user. The large storage capacity of the virtual storage area further compounds the problem of data management.

Thus, it is vital to have a system in place by which the diverse data stored in the virtual storage area of the hierarchical storage apparatus can be easily and efficiently managed.

SUMMARY OF THE INVENTION

It is an object of the present invention to solve at least the above problems in the conventional technology.

A storage apparatus according to one aspect of the present invention includes a primary storage unit that stores data received from a host computer in a first storage area; a secondary storage unit that stores the data stored in the first storage area in a second storage area; a virtual-storage-area setting unit that logically combines the first storage area and the second storage area to set a plurality of virtual storage areas; and a data-storage control unit that controls data storage in such a manner that the data stored in the first storage area that belongs to a predetermined virtual storage area is stored in the second storage area that belongs to the predetermined virtual storage area. Upon receiving a request to read the data stored in the second storage area from the host computer, the storage apparatus reads the data from the second storage area, and sends the data read to the host computer.

A storage control method according to another aspect of the present invention, which is for controlling data storage of a storage apparatus that includes a primary storage unit that stores data received from a host computer in a first storage area, and a secondary storage unit that stores the data stored in the first storage area in a second storage area, and upon receiving a request to read the data stored in the second storage area from the host computer, reads the data from the second storage area, and sends the data read to the host computer, includes setting a plurality of virtual storage areas by logically combining the first storage area and the second storage area; and controlling the data storage in such a manner that the data stored in the first storage area that belongs to a predetermined virtual storage area is stored in the second storage area that belongs to the predetermined virtual storage area.

A computer-readable recording medium according to still another aspect of the present invention stores a computer program that causes a computer to execute the above storage control method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example of a primary storage mapping table 214a shown in FIG. 2;

FIG. 5 is an example of a secondary storage mapping table 245a shown in FIG. 2;

FIG. 12 is an example of a storage capacity data 1445b shown in FIG. 11; and

FIG. 13 is a flowchart of a reconfiguration process of a virtual storage area of a virtual disk $60_1$ through $60_3$ according to the second embodiment.

DETAILED DESCRIPTION

Exemplary embodiments of a storage apparatus, a storage control method, and a storage control program according to the present invention are explained in detail with reference to the accompanying drawings.

Figure 1:
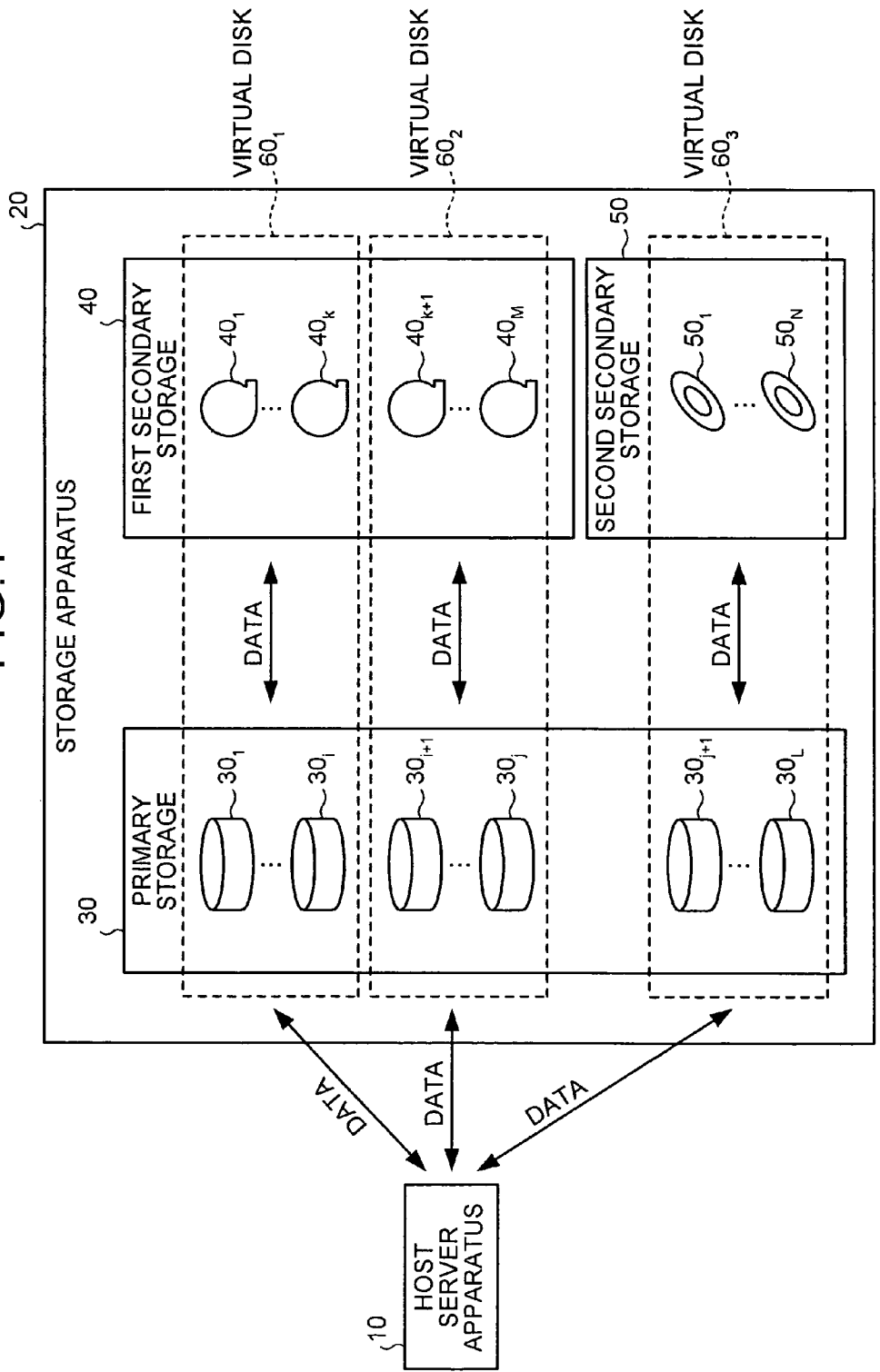
FIG. 1 is a schematic for illustrating a concept of a data storage process according to the present invention.

FIG. 1 is a schematic for illustrating a concept of a data storage process according to the present invention. A storage apparatus 20 that performs the storage process includes a primary storage 30 consisting of a plurality of hard disks $30_1$ through $30_L$, a first secondary storage 40 consisting of a plurality of magnetic tapes $40_1$ through $40_M$, and a second secondary storage 50 consisting of a plurality of optical disks $50_1$ through $50_N$.

The hard disks $30_1$ through $30_L$ are storage medium stored in a hard disk device. The magnetic tapes $40_1$ through $40_M$ and the optical disks $50_1$ through $50_N$ are storage medium stored respectively in a magnetic tape library device and an optical disk library device.

When data is to be stored or read, the magnetic tape library device and the optical disk library device respectively selects the magnetic tape $40_1$ through $40_M$ and the optical disk $50_1$ through $50_N$ from which data is to be read or on which data is to be stored and carries out storing or reading of the data.

More specifically, the optical disks $50_1$ through $50_N$ may be compact disk recordable (CD-R), digital versatile disk recordable (DVD-R), digital versatile disk random access memory (DVD-RAM), phase change rewritable disk (PD), etc.

The storage apparatus 20 logically combines the storage area of the hard disks $30_1$ through $30_L$ and the storage areas of the magnetic tapes $40_1$ through $40_M$ and optical disks $50_1$ through $50_N$ to configure a plurality of virtual storage areas and configures virtual disks $60_1$ through $60_3$ that include the virtual storage areas.

In FIG. 1, in the storage apparatus 20 a virtual storage area of the virtual disk $60_1$ is configured by logically combining the storage areas of the hard disks $30_1$ through $30_i$ and the storage areas of the magnetic tapes $40_1$ through $40_k$. Similarly, the virtual storage area of the virtual disk $60_2$ is configured by logically combining the storage areas of the hard disks $30_{i+1}$ through $30_j$, and the storage areas of the magnetic tapes $40_{k+1}$ through $40_M$. In the same way, the virtual storage area of the virtual disk $60_3$ is configured by logically combining the storage areas of the hard disks $30_{j+1}$ through $30_L$ and the storage areas of the optical disks $50_1$ through $50_N$.

When storing data in the storage apparatus 20, a host server apparatus 10 notifies to the storage apparatus 20 the virtual disk $60_1$ through $60_3$ where data is to be stored and a data storage location in the virtual disks $60_1$ through $60_3$.

The storage apparatus 20 translates the notified storage location in the identified virtual disk $60_1$ through $60_3$ to a data storage location in the hard disk $30_1$ through $30_L$ belonging to the virtual disk $60_1$ through $60_3$ and stores the data in the identified storage location thus configured.

Further, the storage apparatus 20 stores in the first secondary storage 40 or the second secondary storage 50, that is, on the magnetic tapes $40_1$ through $40_M$ or the optical disks $50_1$ through $50_N$, those data from among the data stored on the hard disks $30_1$ through $30_L$ that have not been referred to by the host server apparatus 10 for a long time.

The data storage process is carried out only between the hard disks $30_1$ through $30_L$ and the magnetic tapes $40_1$ through $40_M$ or the optical disks $50_1$ through $50_N$ belonging to the same virtual disks $60_1$ through $60_3$.

Upon receiving a data read request from the host server apparatus 10, the storage apparatus 20 checks whether the requested data is stored on the hard disk $30_1$ through $30_L$ of the primary storage 30, and if the data is stored on the hard disk $30_1$ through $30_L$, the storage apparatus 20 sends the data to the host server apparatus 10.

If the data is not stored on the hard disk $30_1$ through $30_L$, the storage apparatus 20 retrieves the requested data from the magnetic tape $40_1$ through $40_M$ of the first secondary storage 40 or the optical disk $50_1$ through $50_N$ of the second secondary storage 50 and stores the retrieved data on the hard disk $30_1$ through $30_L$. The storage apparatus 20 then sends the data stored in the hard disk $30_1$ through $30_L$ to the host server apparatus 10 that requested the data.

The process involving retrieving data from the magnetic tape $40_1$ through $40_M$ or the optical disk $50_1$ through $50_N$ and storing in the hard disk $30_1$ through $30_L$ is carried out among the hard disks $30_1$ through $30_L$, the magnetic tapes $40_1$ through $40_M$, and the optical disks $50_1$ through $50_N$ belonging to the same virtual disk $60_1$ through $60_3$.

In FIG. 1, the hard disks $30_1$ through $30_L$ of the primary storage 30 are divided into a plurality of sets, namely $30_1$ through $30_i$, $30_{i+1}$ through $30_j$, and $30_{j+1}$ through $30_L$, and each of the sets is assigned to each of the virtual disks $60_1$ through $60_3$. However, it is also possible to allocate all the hard disks $30_1$ through $30_L$ to each of the virtual disks $60_1$ through $60_3$ and allow each of the virtual disks $60_1$ through $60_3$ to use any storage area of the hard disks $30_1$ through $30_L$.

By allowing each of the virtual disks $60_1$ through $60_3$ to use all the hard disks $30_1$ through $30_L$ as the primary storage 30 usage of storage areas of each of the hard disks $30_1$ through $30_L$ can be made more efficient.

Thus, by logically combining the storage areas of the primary storage 30 and the first secondary storage 40 and the second secondary storage 50 to configure the virtual storage areas and the virtual disks $60_1$ through $60_3$ that include the virtual storage areas, diverse data can be managed more easily and efficiently by categorizing them and storing them in different virtual disks $60_1$ through $60_3$ as compared to when all the data is stored in a single storage area.

According to a first embodiment of the present invention, all the hard disks $30_1$ through $30_L$ are assigned to each of the virtual disks $60_1$ through $60_3$ to increase the efficient usage of the storage areas of the hard disks $30_1$ through $30_L$.

Figure 2:
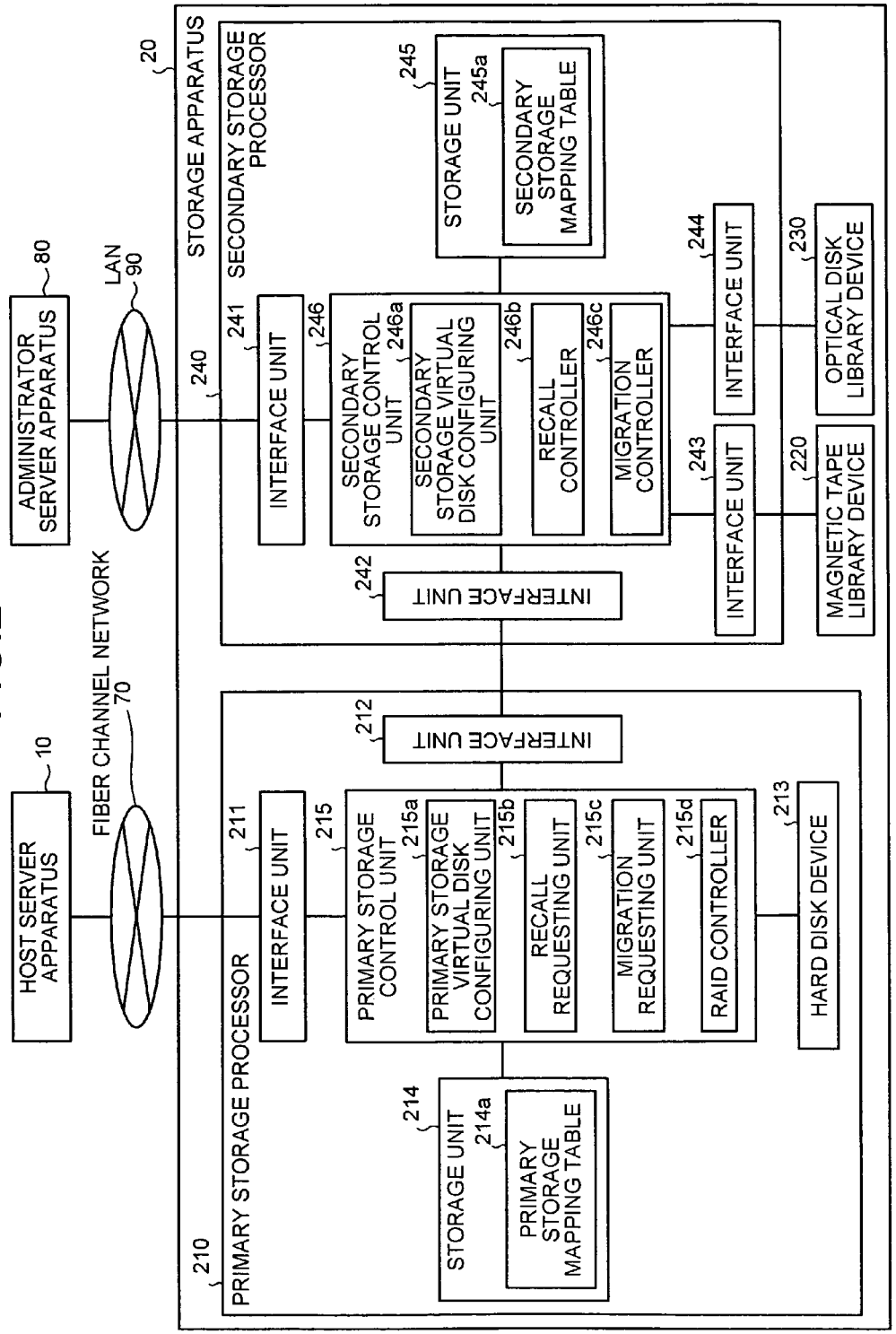
FIG. 2 is a block diagram of a storage apparatus 20 according a first embodiment of the present invention.

FIG. 2 is a block diagram of a storage apparatus 20 according the first embodiment. The storage apparatus 20 is connected to the host server apparatus 10 via a fiber channel network 70 and to an administrator server apparatus 80 via a local area network (LAN) 90.

The host server apparatus 10 is a host computer that sends to storage apparatus 20 a request to store data or read data that is stored in the storage apparatus 20 via the fiber channel network 70. The fiber channel network 70 is made of optical fiber.

The administrator server apparatus 80 accepts an input of information pertaining to the configuration of the virtual disks $60_1$ through $60_3$ from the user. Once the configuration information is input by the user, the administrator server apparatus 80 connects to the storage apparatus 20 via the LAN 90 and sends the configuration information of the virtual disks $60_1$ through $60_3$ to the storage apparatus 20.

The storage apparatus 20 configures the virtual disks $60_1$ through $60_3$ based on the configuration information received from the administrator server apparatus 80 and stores data on or reads data from the virtual disks $60_1$ through $60_3$.

To be specific, the storage apparatus 20 configures the virtual disks $60_1$ through $60_3$ that include the virtual storage areas configured by logically combining the storage areas of the primary storage 30 and storage areas of the first secondary storage 40 and the second secondary storage 50 and stores data on or reads data from the primary storage 30 or the first secondary storage 40 or the second secondary storage 50 for each of the virtual disks $60_1$ through $60_3$.

The storage apparatus 20 includes a primary storage processor 210, a magnetic tape library device 220, an optical disk library device 230, and a secondary storage processor 240.

The primary storage processor 210 and the secondary storage processor 240, the secondary storage processor 240 and the magnetic tape library device 220, as well as the secondary storage processor 240 and the optical disk library device 230 are respectively connected by a fiber channel circuit made of optical fiber.

The primary storage processor 210 includes interface units 211 and 212, a hard disk device 213, a storage unit 214, and a primary storage control unit 215. The interface unit 211 is a network interface that facilitates data exchange between the primary storage processor 210 and the host server apparatus 10 via the fiber channel network 70.

The interface unit 212 is a network interface that facilitates data exchange between the primary storage processor 210 and the secondary storage processor 240 via the fiber channel circuit. The hard disk device 213 stores the hard disks $30_1$ through $30_L$, stores data on the hard disks $30_1$ through $30_L$, and reads the data stored on the hard disks $30_1$ through $30_L$.

The hard disk device 213 uses a redundant array of independent disks (RAID) technology. The RAID technology involves distributing data to a plurality of hard disks as well as storing data in duplicate on a plurality of hard disks, thereby enhancing the storing and retrieving speed and ensuring reliability in the event of data corruption.

Further, the hard disk device 213 configures a plurality of logical units by logically integrating or dividing storage areas of the plurality of hard disks $30_1$ through $30_L$. Each logical unit operates by using the RAID technology. That is, data is distributed among/stored in duplicate on a plurality of hard disks $30_1$ through $30_L$ belonging to each logical unit.

Figure 3:
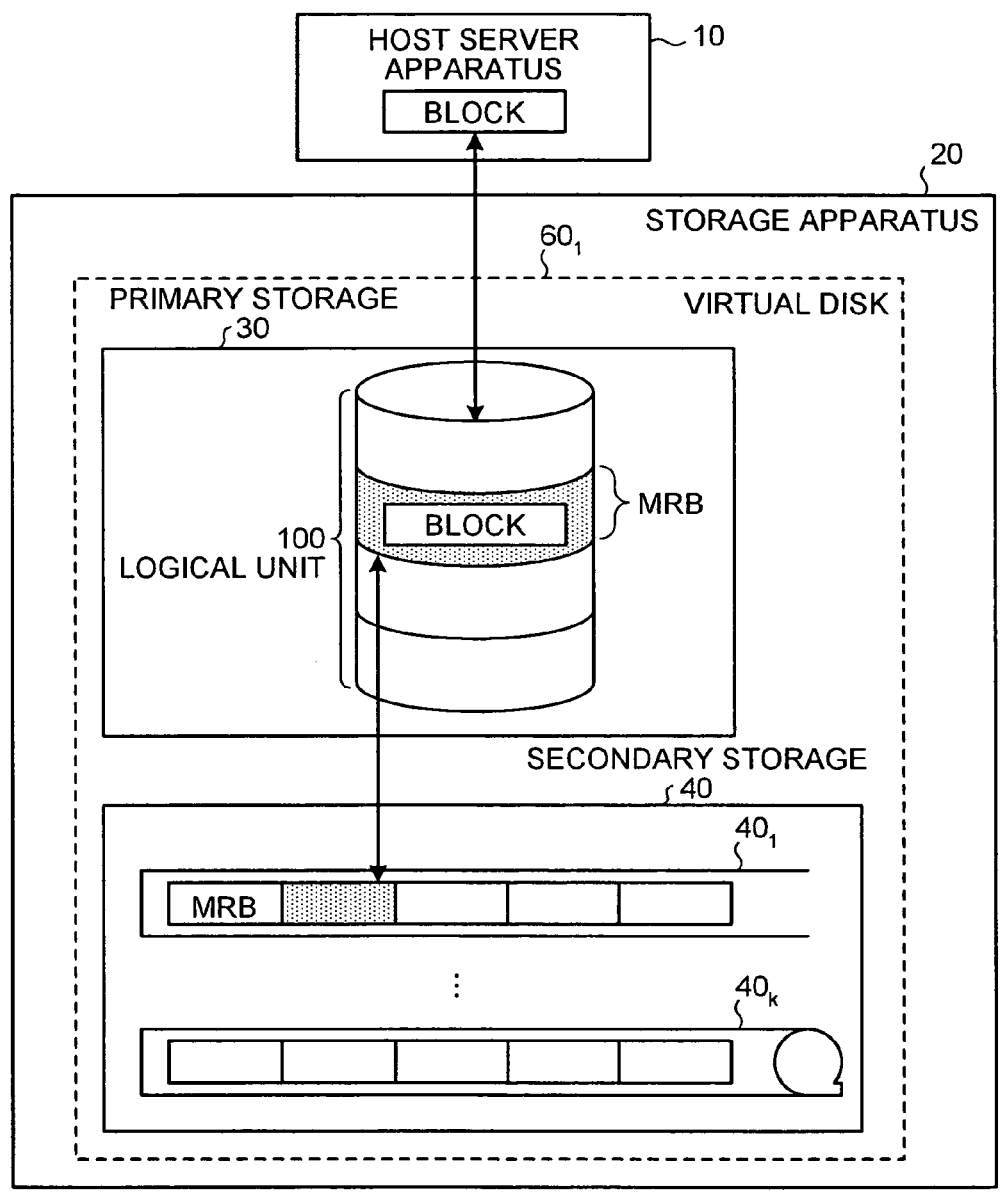
FIG. 3 is a schematic for illustrating a creation of MRB by dividing a storage area of a logical unit 100.

The storage area of the logical unit is divided into a plurality of blocks called migration recall blocks (MRBs). FIG. 3 is a schematic for illustrating a creation of MRB by dividing a storage area of a logical unit 100.

The example shown in FIG. 3 only shows the virtual disk $60_1$ of FIG. 1, and the logical unit 100 is configured by integrating the storage areas of the hard disks $30_1$ through $30_i$ of the primary storage 30.

The data storage area of the logical unit 100 is divided into a plurality of blocks called MRBs. The size of each MRB is in the range of 256 MB.

The storing of data in the logical unit 100 on the magnetic disks $40_1$ through $40_k$ of the first secondary storage 40 and vice versa is carried out in units of MRB.

'Migration' refers to the process of storing the data stored in the primary storage 30 in the first secondary storage 40. "Recall" refers to the process of storing the data stored in the first secondary storage 40 in the primary storage 30.

The host server apparatus 10 can store data in or read data from the primary storage 30 in units smaller than MRB.

When storing data or reading data, the host server apparatus 10 notifies to the storage apparatus 20 the virtual disk $60_1$ in which data is to be stored or from which data is to be read and a virtual disk relative address of the data. The virtual disk relative address is a piece of information that indicates a storage location of the data in the logical block configured by dividing the virtual storage area of the virtual disk $60_1$ into blocks the size of MRB.

Each logical block is further divided into a plurality of blocks by units of which the host server apparatus 10 stores and reads data. The storage location of the data in a logical block is identified by a relative block number from the first block of the plurality of blocks into which the logical block is divided. The relative block number corresponds to the virtual disk relative address.

Based on the virtual disk $60_1$ and the virtual disk relative address, the storage apparatus 20 determines the logical unit 100, the MRB of the logical unit 100, and the storage location in the MRB from which data is to be read or in which data is to be stored, and reads the data from or stores the data in the determined storage location. The MRB of the logical unit 100 can be identified based on the number of blocks into which the MRB is divided and the information pertaining to the relative block number.

To return to FIG. 2, the storage unit 214 is a storage device such as the hard disk device. The storage unit 214 stores a primary storage mapping table 214a. The primary storage mapping table 214a stores in a correlated form the storage locations of the data in the virtual disks $60_1$ through $60_3$ and the corresponding storage locations of the data in the logical unit 100.

FIG. 4 is an example of the primary storage mapping table 214a shown in FIG. 2. The primary storage mapping table 214a stores various data such as virtual disk number, virtual disk logical block address, logical unit number, logical unit logical block address, status, and last accessed date.

The virtual disk number is an identification number that distinguishes the virtual disks $60_1$ through $60_3$. The virtual disk logical block address is an address that identifies the logical block in the virtual storage area of the virtual disk $60_1$ through $60_3$ in which the data is stored.

The logical unit number is an identification number that distinguishes the logical units configured by logically integrating or dividing the storage areas of the plurality of hard disks $30_1$ through $30_L$. The logical unit logical block address is an address that specifies the MRB in the storage area of the logical unit 100 in which data is to be stored or from which data is to be read.

Status pertains to the synchrony between the primary storage 30 and the first secondary storage 40 or the second secondary storage 50. The status can be 'Hit', 'Dirty', or 'Miss'.

The status 'Hit' indicates that the data stored in the primary storage 30 and the data stored in the first secondary storage 40 or the second secondary storage 50 match. The status 'Dirty' indicates that the data in the primary storage 30 is modified after the data is stored in the first secondary storage 40 or the second secondary storage 50 and the modification is not reflected in the first secondary storage 40 or the second secondary storage 50, leading to disparity of data in the two storages.

When the status is 'Dirty', the storage apparatus 20 updates the data in the first secondary storage 40 or the second secondary storage 50 with the data in the primary storage 30 at pre-specified intervals, and makes the data in the primary storage 30 and the first secondary storage 40 or the second secondary storage 50 match.

The status 'Miss' indicates that a specified data is not yet stored in the primary storage 30 even though virtual storage areas of the virtual disks $60_1$ through $60_3$ are configured in the primary storage 30. When the status is 'Miss', an exclusive control is exerted in such a way that no other data is stored until the specified data is stored in the virtual storage area configured in the primary storage 30.

Last accessed date is data indicating the date and time when the data was last accessed by the host server apparatus 10. The storage apparatus 20 refers to the last accessed date compares the current date and the last accessed date. If the difference between the two exceeds a predetermined value, the storage apparatus 20 shifts the data from the primary storage 30 to the first secondary storage 40 or the second secondary storage 50.

In the example shown in FIG. 4, information pertaining to the virtual disks $60_1$ through $60_3$, namely, the virtual disk number '0' and the virtual disk logical block address '2', is stored correlated to information pertaining to the primary storage 30 namely, the logical unit logical block address '24', the status 'Hit', and the last accessed date '2004/8/24, 13:15: 23'. Information pertaining to other virtual disks $60_1$ through $60_3$ is also stored correlated to information pertaining to the primary storage 30.

Referring back to FIG. 2, the primary storage control unit 215 controls storing data on or reading data from the primary storage 30. Further, if the data requested by the host server apparatus 10 is not stored in the primary storage 30 the primary storage control unit 215 requests the secondary storage processor 240 to read the requested data from the first secondary storage 40 or the second secondary storage 50 and send the data to the host server apparatus 10.

The primary storage control unit 215 includes a primary storage virtual disk configuring unit 215a, a recall requesting unit 215b, a migration requesting unit 215c, and a RAID controller 215d. The primary storage virtual disk configuring unit 215a manages the primary storage mapping table 214a.

To be specific, upon receiving from the host server apparatus 10 a request to store data, the primary storage virtual disk configuring unit 215a checks whether the virtual disk number and the virtual disk logical block address notified by the host server apparatus 10 are registered in the primary storage mapping table 214a.

If the notified virtual disk number and the virtual disk logical block address are registered in the primary storage mapping table 214a, the primary storage virtual disk configuring unit 215a gets the logical unit number and the logical unit logical block address corresponding to the virtual disk number and the virtual disk logical block address.

The primary storage virtual disk configuring unit 215a then requests the RAID controller 215d to store the data in the in the logical unit 100 specified by the logical unit number, the logical unit logical block address, and virtual disk relative address notified by the host server apparatus 10.

If the virtual disk number and the virtual disk logical block address are not registered in the primary storage mapping table 214a, the primary storage virtual disk configuring unit 215a requests the recall requesting unit 215b to send a recall request to the secondary storage processor 240.

The recall request is a message that requests the reading of data, in units of MRB, stored on the magnetic tape $40_1$ through $40_M$ of the magnetic device library device 220 or on the optical disk $50_1$ through $50_N$ of the optical disk library device 230 and to send the read data, in units of MRB, to the primary storage processor 210.

When the primary storage processor 210 receives the data from the secondary storage processor 240, the RAID controller 215d exerts control in such a way that the data is stored on the hard disk $30_1$ through $30_L$ of the hard disk device 213.

The data received in units of MRB from the secondary storage processor 240 is partially or completely updated by the store data request received in units of blocks from the host server apparatus 10.

The primary storage virtual disk configuring unit 215a sets the status of the primary storage mapping table 214a to 'Hit', 'Dirty', or 'Miss' according to the status of the storage in the primary storage 30 and the first secondary storage 40 or the second secondary storage 50.

When the data on the hard disk $30_1$ through $30_L$ is stored or when the data stored on the hard disk $30_1$ through $30_L$ is referred to, the primary storage virtual disk configuring unit 215a updates the information pertaining to the last accessed date of the primary storage mapping table 214a.

The recall requesting unit 215b sends the recall request when there is a request from the primary storage virtual disk configuring unit 215a to send the recall request to the secondary storage processor 240.

The migration requesting unit 215c sends a migration request to the secondary storage processor 240 to transfer the data on the hard disks $30_1$ through $30_L$ of the hard disk device 213 that has not been referred to for a long time.

The migration request is a message that requests the storing of data on the hard disks $30_1$ through $30_L$ of the hard disk device 213 either on the magnetic tapes $40_1$ through $40_M$ of the magnetic table library device 220 or the optical disks $50_1$ through $50_N$ of the optical disk library device 230.

Further, when the available space in the logical unit 100 formed by the hard disks $30_1$ through $30_L$ falls below a predetermined value, the migration requesting unit 215c searches for data that has a 'Hit' status in the primary storage mapping table 214a, and requests the primary storage virtual disk configuring unit 215a to delete the data from the primary storage mapping table 214a.

The RAID controller 215d controls the hard disk device 213 in such a way that data is distributed among the plurality of hard disks $30_1$ through $30_L$ and duplicates of the same data are stored on several hard disks $30_1$ through $30_L$.

The magnetic tape library device 220 stores the plurality of magnetic tapes $40_1$ through $40_M$ as well as reads from or writes to an intended magnetic tape $40_1$ through $40_M$ by selecting the magnetic tape $40_1$ through $40_M$ from which data is to be read or on which data is to be stored.

The optical disk library device 230 reads from or writes to an intended optical disk $50_1$ through $50_N$ by selecting the optical disk $50_1$ through $50_N$ from which data is to be read or on which data is to be stored.

The secondary storage processor 240 controls storing data on or reading data from the first secondary storage 40 and the second secondary storage 50 which include the magnetic tapes $40_1$ through $40_M$ stored in the magnetic tape library device 220 and the optical disks $50_1$ through $50_N$ stored in the optical disk library device 230.

The secondary storage processor 240 includes interface units 241 through 244, a storage unit 245, and a secondary storage control unit 246. The interface unit 241 is a network interface that facilitates data exchange between the secondary storage processor 240 and the administrator server apparatus 80 via the LAN 90.

The interface units 242 through 244 are network interfaces that facilitate data exchange between the secondary storage processor 240 and, respectively, the primary storage processor 210, the magnetic tape library device 220, and the optical disk library device 230.

The storage unit 245 is a storage device such as the hard disk. The storage unit 245 stores a secondary storage mapping table 245a. The secondary storage mapping table 245a stores in a correlated form the storage location of the data in the virtual storage area of the virtual disk $60_1$ through $60_3$, the storage location of the data in the storage area of either the magnetic tape $40_1$ through $40_M$ stored in the magnetic tape library device 220 or the optical disk $50_1$ through $50_N$ stored in the optical disk library device 230.

FIG. 5 is an example of the secondary storage mapping table 245*a* shown in FIG. 2. The secondary storage mapping table 245*a* stores various data such as virtual disk number, virtual disk logical block address, removable media number, removable media block number, and library number.

The virtual disk number is identical to the virtual disk number in the primary mapping table 214*a* shown in FIG. 4 and is an identification number that distinguishes the virtual disks $60_1$ through $60_3$. The virtual disk logical block address is an address that identifies the logical block in the virtual storage area of the virtual disk $60_1$ through $60_3$ in which the data is stored.

The removable media number is an identification number that distinguishes the MRB in which data is stored or from which data is read, when the storage area of the magnetic tape $40_1$ through $40_M$ or the optical disk $50_1$ through $50_N$ is divided into MRBs.

The library number is an identification number that distinguishes the magnetic tape library device 220 and the optical disk library device 230 in which the magnetic tapes $40_1$ through $40_M$ and the optical disks $50_1$ through $50_N$ are respectively stored.

In the example shown in FIG. 5, information pertaining to the virtual disks $60_1$ through $60_3$, namely the virtual disk number '0' and the virtual disk logical block address '0', is stored correlated to information pertaining to the first secondary storage 40 and the second secondary storage 50, namely, the removable media number '0', the removable media block number '0', and the library number '0'. Information pertaining to other virtual disks $60_1$ through $60_3$ is also stored correlated to information pertaining to the first secondary storage 40 and the second secondary storage 50.

The secondary storage control unit 246 controls storing data on or reading data from the first secondary storage 40 or the second secondary storage 50, that is, the magnetic tapes $40_1$ through $40_M$ or the optical disks $50_1$ through $50_N$.

Further, the secondary storage control unit 246 controls the recall or migration of the data upon receiving the recall request or the migration request from the primary storage processor 210.

The secondary storage control unit 246 includes a secondary storage virtual disk configuring unit 246*a*, a recall controller 246*b*, and migration controller 246*c*. The secondary storage virtual disk configuring unit 246*a* manages the secondary storage mapping table 245*a*.

To be specific, the secondary storage virtual disk configuring unit 246*a* receives information pertaining to configuring the virtual disk $60_1$ through $60_3$ from the administrator server apparatus 80 and configures the virtual disk $60_1$ through $60_3$ by storing the configuration information in the secondary storage mapping table 245*a*.

The virtual disk configuration information includes the virtual disk number of the virtual disk $60_1$ through $60_3$, the removable media number of the magnetic tape $40_1$ through $40_M$ or the optical disk $50_1$ through $50_N$ that refers back to the virtual disk $60_1$ through $60_3$, and the library number of the magnetic tape library device 220 or the optical disk library device 230 in which the magnetic tape $40_1$ through $40_M$ or the optical disk $50_1$ through $50_N$ are respectively stored.

Upon receiving the migration request from the migration requesting unit 215*c* of the primary storage processor 210, the secondary storage virtual disk configuring unit 246*a* assigns a virtual disk logical block address and a removable media block number to the data that is transferred, and stores the assigned virtual disk logical block address and the removable media block number in the secondary storage mapping table 245*a*.

Thus, the logical blocks of the virtual disks $60_1$ through $60_3$ and the MRBs of the magnetic tapes $40_1$ through $40_M$ or the optical disks $50_1$ through $50_N$ are correlated. Consequently, the MRB of the magnetic tape $40_1$ through $40_M$ or the optical disk $50_1$ through $50_N$ can be identified by identifying the location block of the virtual disk $60_1$ through $60_3$ on which data is to be stored or from which data is to be read.

Once correlation of the virtual disk number and the virtual disk logical block address is established with the removable media number, the removable media block number, and the library number in the secondary storage mapping table 245*a*, subsequently data is stored on or read from the magnetic tapes $40_1$ through $40_M$ or the optical disks $50_1$ through $50_N$ based on the correlation.

Upon receiving the recall request from the recall requesting unit 215*b* of the primary storage processor 210, the recall controller 246*b* exerts control in such a way that data is read from the magnetic tape $40_1$ through $40_M$ of the magnetic tape library device 220 or the optical disk $50_1$ through $50_N$ of the optical disk library device 230.

The recall controller 246*b* then sends the data read from the magnetic tape library device 220 or the optical disk library device 230 to the RAID controller 215*d* of the primary storage processor 210 and stores the data on the hard disk $30_1$ through $30_L$ of the hard disk device 213.

To be specific, upon receiving the recall request, the recall controller 246*b* refers to the secondary storage mapping table 245*a* and gets the removable media number, the removable media block number, and the library number of the magnetic tape $40_1$ through $40_M$ or the optical disk $50_1$ through $50_N$ corresponding to the virtual disk number and the virtual disk logical block address.

The recall controller 246*b* then controls the magnetic tape library device 220 or the optical disk library device 230 in such a way that the data is read from the MRB of the magnetic tape $40_1$ through $40_M$ or the optical disk $50_1$ through $50_N$ identified by the removable media number, the removable media block number, and the library number.

Upon receiving the migration request from the migration requesting unit 215*c* of the primary storage processor 210, the migration controller 246*c* exerts control in such a way that data is stored on the magnetic tape $40_1$ through $40_M$ of the magnetic tape library device 220 or the optical disk $50_1$ through $50_N$ of the optical disk library device 230.

To be specific, upon receiving the migration request, the migration controller 246*c* refers to the secondary storage mapping table 245*a* and gets the removable media number, the removable media block number, and the library number of the magnetic tape $40_1$ through $40_M$ or the optical disk $50_1$ through $50_N$ corresponding to the virtual disk number and the virtual disk logical block address.

The migration controller 246*c* then controls the magnetic tape library device 220 or the optical disk library device 230 in such a way that the data is stored in the MRB of the magnetic tape $40_1$ through $40_M$ or the optical disk $50_1$ through $50_N$ identified by the removable media number, the removable media block number, and the library number.

Figure 6:
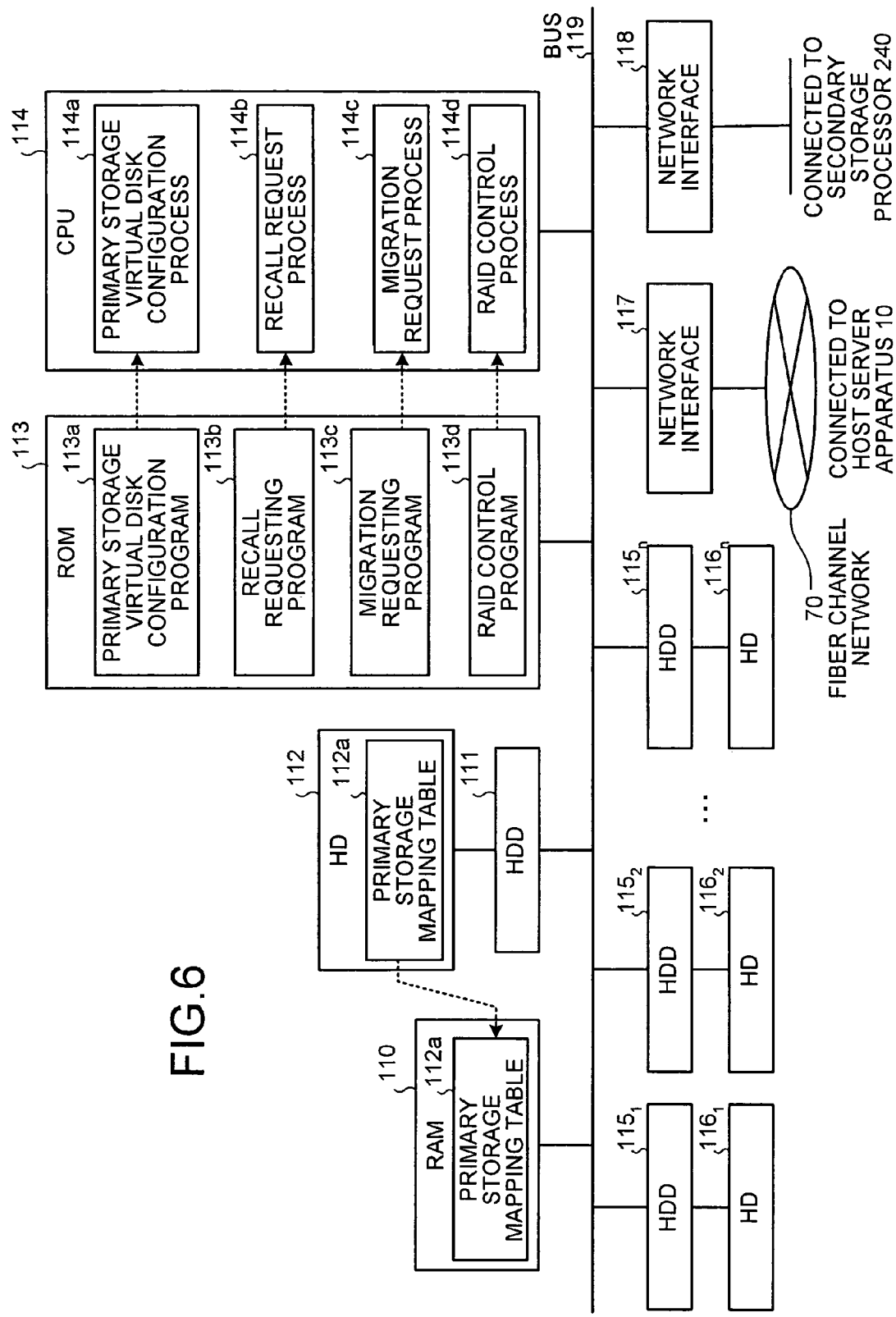
FIG. 6 is a hardware configuration of a primary storage processor 210 of the storage apparatus 20 shown in FIG. 2.
Figure 7:
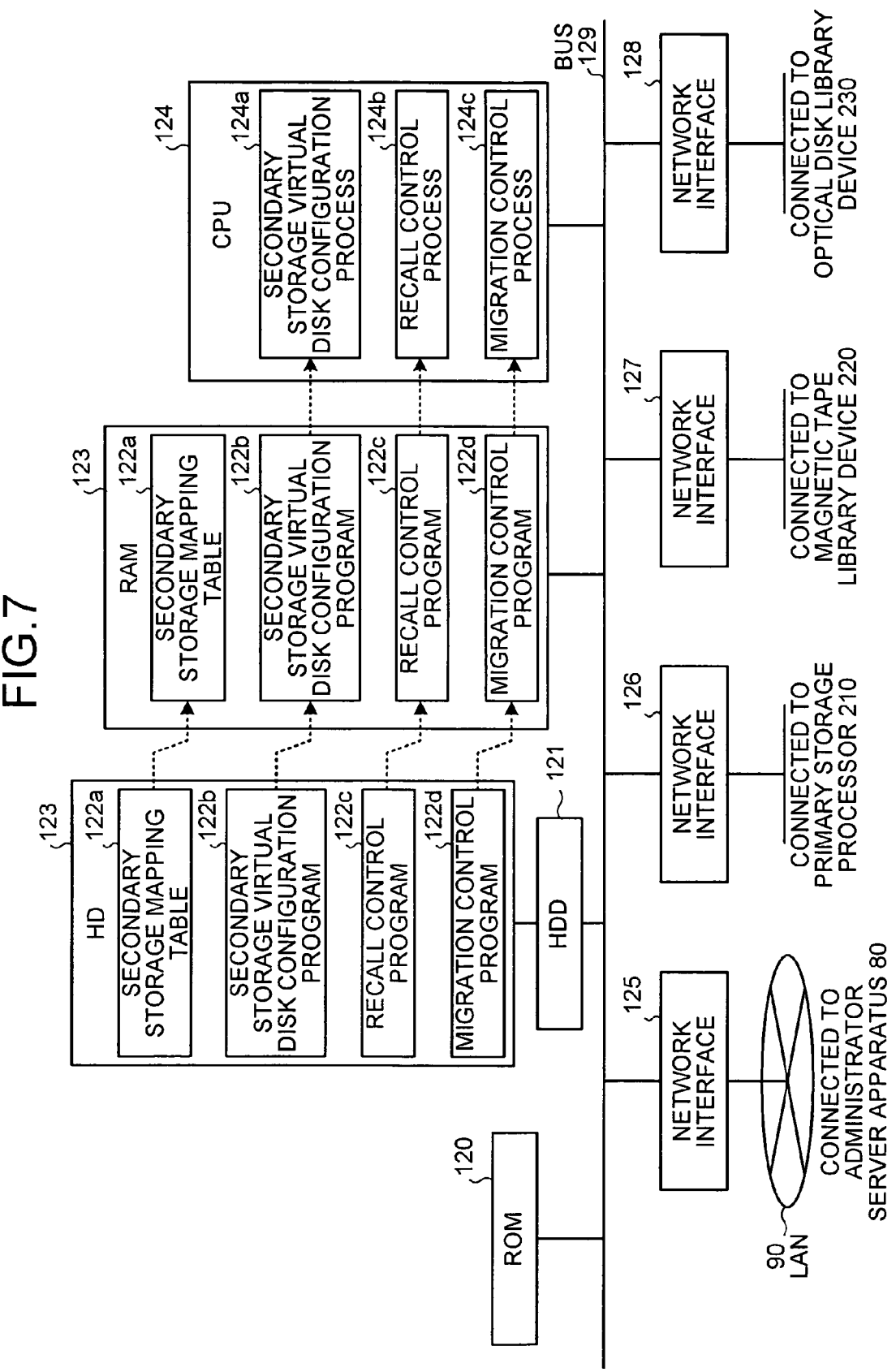
FIG. 7 is a hardware configuration of a secondary storage processor 240 of the storage apparatus 20 shown in FIG. 2.

Hardware configurations of the primary storage processor 210 and the secondary storage processor 240 of the storage apparatus 20 shown in FIG. 2 are explained next. FIG. 6 is the hardware configuration of the primary storage processor 210 of the storage apparatus 20 shown in FIG. 2. FIG. 7 is the hardware configuration of the secondary storage processor 240 of the storage apparatus 20 shown in FIG. 2.

As shown in FIG. 6, the primary storage processor 210 includes a random access memory (RAM) 110, a hard disk drive (HDD) 111, a hard disk (HD) 112, a read only memory (ROM) 113, a central processing unit (CPU) 114, HDD $115_1$ through $115n$, HD $116_1$, through $116n$, network interfaces 117 and 118, and a bus 119 to which all the components mentioned above are connected The HD 112 is a storage medium that magnetically stores data such as a primary storage mapping table 112a. The primary storage mapping table 112a corresponds to the primary storage mapping table 214a of FIG. 2. The HDD 111 controls storing data on and reading data from the HD 112.

When the CPU 114 issues a reference request, the primary storage mapping table 112a is read into the RAM 110, which is a volatile storage device, from where the CPU 114 refers to it.

A primary storage virtual device configuration program 113a, a recall requesting program 113b, a migration requesting program 113c, and a RAID control program 113d are stored in advance in the ROM 113, which is a non-volatile storage device.

Each of the programs 113a through 113d is read and executed by the CPU 114 and respectively result in a primary storage virtual disk configuration process 114a, a recall request process 114b, a migration request process 114c, and a RAID control process 114d.

The primary storage virtual disk configuration process 114a, the recall request process 114b, the migration request process 114c, and the RAID control process 114d respectively correspond to the primary storage virtual disk configuring unit 215a, the recall requesting unit 215b, the migration requesting unit 215c, and the RAID controller 215d of FIG. 2.

The HDD $115_1$ through $115_n$ respectively control storing data on and reading data from the HD $116_1$ through $116_n$. The HDD $115_1$ through $115_n$ and the HD $116_1$ through $116_n$ correspond to the hard disk device 213 of FIG. 2.

The network interface 117 facilitates data exchange between the primary storage processor 210 and the host server apparatus 10 via the fiber channel network 70. The network interface 118 facilitates data exchange between the primary storage processor 210 and the secondary storage processor 240 via the fiber channel circuit. The network interfaces 117 and 118 respectively correspond to the interface units 211 and 212 of FIG. 2.

The secondary storage processor 240 includes, as shown in FIG. 7, a ROM 120, an HDD 121, an HD 122, a RAM 123, a CPU, network interfaces 125 through 128, and a bus 129 to which all the components mentioned above are connected.

The ROM 120 is a non-volatile storage device which stores programs such as the boot program of the secondary storage processor 240. The HD 122 stores data magnetically and includes a secondary storage mapping table 122a, a secondary storage virtual disk configuration program 122b, a recall control program 122c, and a migration control program 122d. The HDD 121 controls storing data on and reading data from the HD 122.

When the CPU 124 issues a reference request, the secondary storage mapping table 122a, the secondary storage virtual disk configuration program 122b, the recall control program 122c, and the migration control program 122d are stored on the RAM 123 which is a volatile storage device.

Each of the programs 122b through 122d is read and executed by the CPU 124 and respectively result in a secondary storage virtual disk configuration process 124a, a recall control process 124b, and a migration control process 124c.

The secondary storage virtual disk configuration process 124a, the recall control process 124b, and the migration control process 124c respectively correspond to the secondary storage virtual disk configuring unit 246a, the recall controller 246b, and the migration controller 246c of FIG. 2.

The network interface 125 facilitates data exchange between the secondary storage processor 240 and the administrator server apparatus 80 via the LAN 90. The network interface 126 facilitates data exchange between the secondary storage processor 240 and the primary storage processor 210 via the fiber channel circuit.

The network interface 127 facilitates data exchange between the secondary storage processor 240 and the magnetic tape library apparatus 220 via the fiber channel circuit. The network interface 128 facilitates data exchange between the secondary storage processor 240 and the optical disk library apparatus 230 via a fiber channel circuit. The network interfaces 125 through 128 respectively correspond to the interface units 241 through 244 of FIG. 2.

Figure 8:
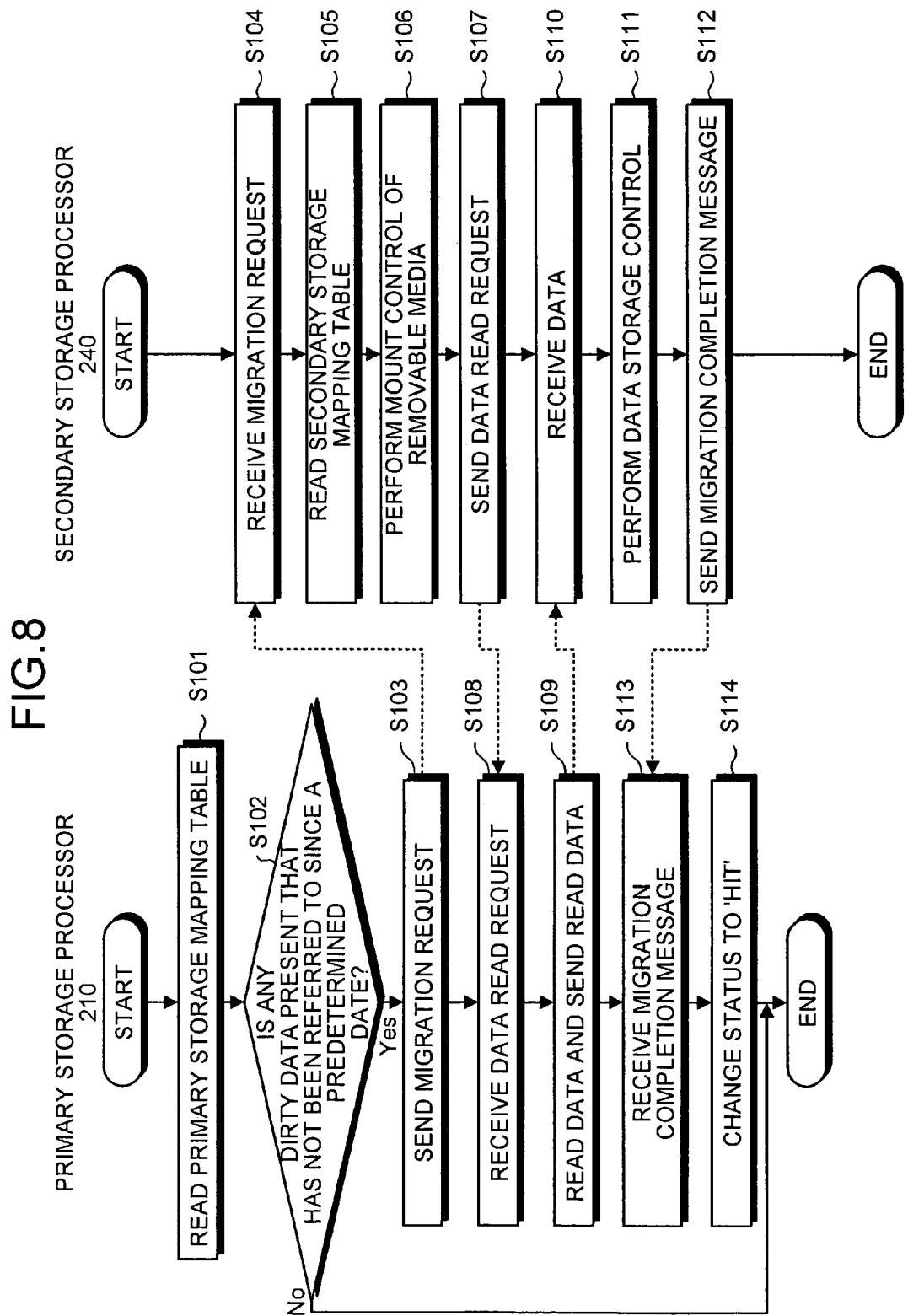
FIG. 8 is a flowchart of a migration process performed by the storage apparatus 20 according to the first embodiment.

A migration process performed by the storage apparatus 20 according to the first embodiment is explained next. FIG. 8 is flowchart of the migration process performed by the storage apparatus 20 according to the first embodiment.

It is assumed here that the virtual disk number and the virtual disk logical block address are stored in the secondary storage mapping table 245a correlated form to the removable media number, the removable media block number, and the library number by the secondary storage virtual disk configuring unit 246a.

The migration requesting unit 215c of the primary storage processor 210 of the storage apparatus 20 reads the primary storage mapping table 214a (Step S101), and based on the last accessed date, determines whether any data is present that has not been referred to since a predetermined date and that has the status 'Dirty' (Step S102).

If data that satisfies the above conditions does not exist ("No" at Step S102), the migration requesting unit 215c finishes the migration process.

If data that has not been referred to since the predetermined data and that has the status 'Dirty' is present ("Yes" at Step S102), the migration requesting unit 215c sends the migration request to the secondary storage processor 240 (Step S103). The migration request includes the virtual disk number, the virtual disk logical block address, the logical unit number, and the logical unit logical block address of the data to be transferred.

Upon receiving the migration request sent by the primary storage processor 210 (Step S104), the migration controller 246c of the secondary storage processor 240 reads the secondary storage mapping table 245a from the storage unit 245 (Step S105), and exerts control the on magnetic tape library device 220 or the optical disk library device 230 in such a way as to mount the removable media in the form of magnetic tape $40_1$ through $40_M$ or the optical disk $50_1$ through $50_N$ to which data is to be transferred (Step S106).

To be specific, The migration controller 246c retrieves from the secondary storage mapping table 245a the removable media number and the library number corresponding to the virtual disk number and the virtual disk logical block address, and exerts control on the magnetic tape library device 220 or the optical disk library device 230 in such a way as to mount the removable media corresponding to the retrieved removable media number and the library number.

The migration controller 246c then sends to the primary storage processor 210 the data read request, which is a request to read the data to be transferred from the hard disk 213 (Step S107).

Upon receiving the data read request from the migration controller 246c of the secondary storage processor 240 (Step S108), the migration requesting unit 215c of the primary storage processor 210 requests the RAID controller 215d to read the data to be transferred from the hard disk device 213, and sends the read data to the secondary storage processor 240 (Step S109).

Upon receiving the data sent by the migration requesting unit 215c of the primary storage processor 210 (Step S110), the migration controller 246c of the secondary storage processor 240 exerts control on the magnetic tape library device 220 or the optical disk library device 230 in such a way as to store the received data in the MRB of the magnetic tape $40_1$ through $40_M$ or the optical disk $50_1$ through $50_N$ (Step S111).

The migration controller 246c identifies the MRB in the magnetic tape $40_1$ through $40_M$ or the optical disk $50_1$ through $50_N$ in which the data is to be stored by retrieving from the secondary storage mapping table 245a the removable medial block number corresponding to the virtual disk logical block address.

Once the data is stored in the identified MRB, the migration controller 246c sends a migration completion message to the primary storage processor 210 (Step S112) and ends the migration process of the secondary storage processor 240.

The migration requesting unit 215c of the primary storage processor 210 receives the migration completion message sent by the migration controller 246c of the secondary storage processor 240 (Step S113).

The primary storage virtual disk configuring unit 215a then updates the status of the data that was transferred in the primary storage mapping table 214a as 'Hit' (Step S114) and ends the migration process of the primary storage processor 210.

Figure 9:
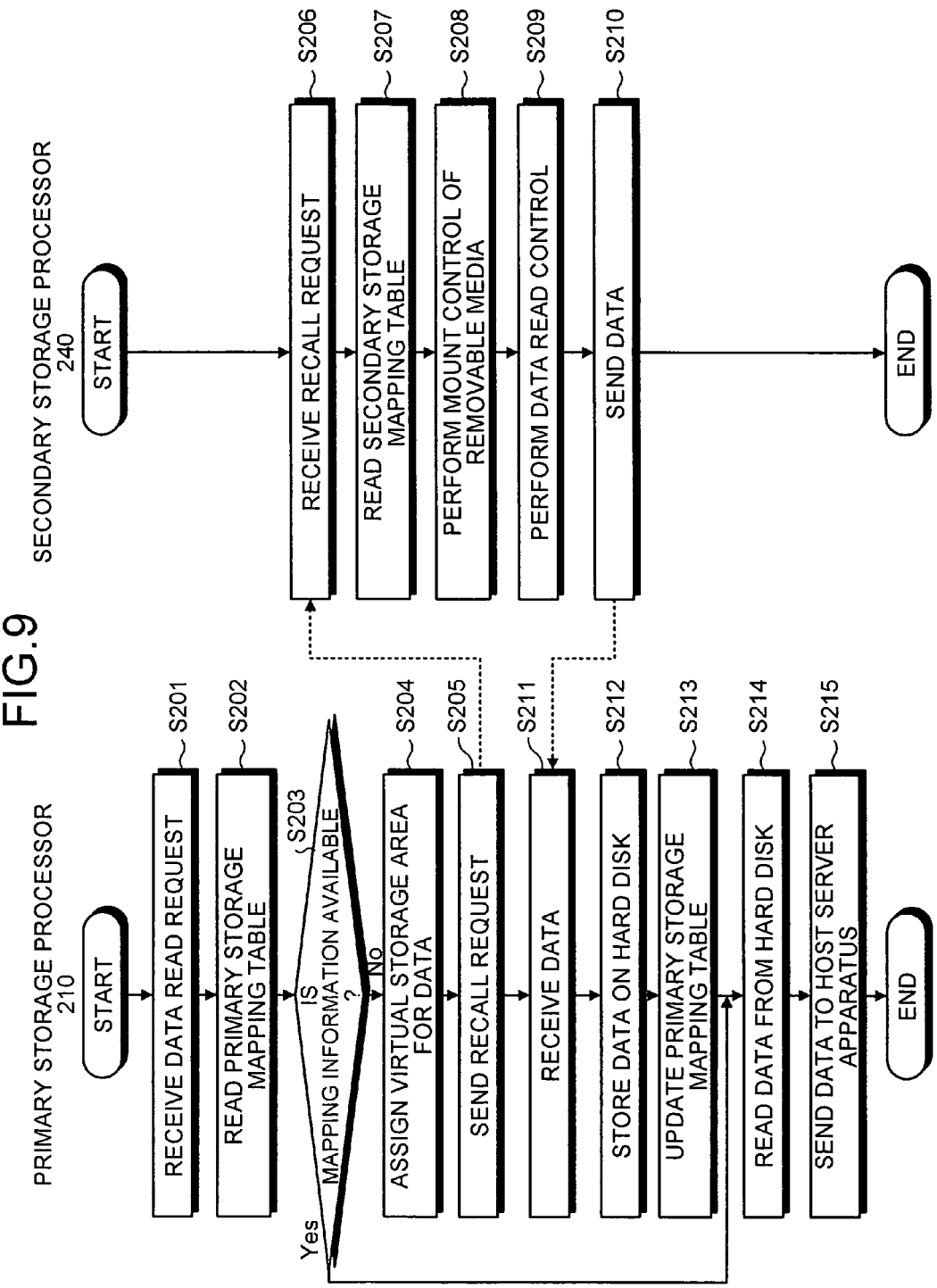
FIG. 9 is a flowchart of a data reading process performed by the storage apparatus 20 according to the first embodiment.

A data reading process performed by the storage apparatus 20 according to the first embodiment is explained next. FIG. 9 is a flowchart of the data reading process performed by the storage apparatus 20 according to the first embodiment.

Upon receiving a data read request from the host server apparatus 10 (Step S201), the primary storage virtual disk configuring unit 215a of the primary storage processor 210 of the storage apparatus 20 reads the primary storage mapping table 214a (Step S202).

The primary storage virtual disk configuring unit 215a receives the information pertaining to the virtual disk number and the virtual disk relative address of the virtual disk $60_1$ through $60_3$ in which the intended data is stored from the host server apparatus 10.

The primary storage virtual disk configuring unit 215a then determines whether mapping information of the intended data is stored in the primary storage mapping table 214a (Step S203). Mapping information refers to information pertaining to correspondence of the virtual disk number and the virtual disk logical block address to the logical unit 100 and the logical unit logical block address.

If the mapping information is stored in the primary storage mapping table 214a ("Yes" at Step S203), the RAID controller 215d reads the data from the hard disk $30_1$ through $30_L$ of the hard disk device 213 based on the mapping information (Step S214), and sends the read data to the host server apparatus 10 (Step S215), ending the data read process.

If the mapping information is not stored in the primary storage mapping table 214a ("No" at Step S203), the primary storage virtual disk configuring unit 215a assigns a virtual storage area in the virtual disk $60_1$ through $60_3$ for the data for which a data read request was received from the host server apparatus 10 (Step S204).

To be specific, the primary storage virtual disk configuring unit 215a assigns a logical unit number and a logical unit logical block address for the virtual disk logical block address specified by the virtual disk number and the virtual disk relative address of the virtual disk $60_1$ through $60_3$ notified by the host server apparatus 10.

The recall requesting unit 215b then sends the secondary storage processor 240 the recall request (Step S205).

The recall controller 246b of the secondary storage processor 240 receives the recall request sent by the recall requesting unit 215b of the primary storage processor 210 (Step S206).

The recall controller 246b reads the secondary storage mapping table 245a (Step S207), and exerts control on the magnetic tape library device 220 or the optical disk library device 230 in such a way as to mount the removable media in the form of the magnetic tape $40_1$ through $40_M$ or the optical disk $50_1$ through $50_N$ (Step S208).

To be specific, the recall controller 246b, retrieves the removable media number and the library number corresponding to the virtual disk number and the virtual disk logical block address, and exerts control on the magnetic tape library device 220 or the optical disk library device 230 in such a way as to mount the removable media corresponding to the retrieved removable media number and the library number.

The recall controller 246b then exerts control on the magnetic tape library device 220 or the optical disk library device 230 in such a way as to read from the magnetic tape $40_1$ through $40_M$ or the optical disk $50_1$ through $50_N$ the data for which the recall request was made (Step S209).

The recall controller 246b identifies the MRB of the magnetic tape $40_1$ through $40_M$ or the optical disk $50_1$ through $50_N$ in which the intended data is stored by retrieving from the secondary storage mapping table 245a the removable media block number corresponding to the virtual disk logical block address.

The recall controller 246b then sends the read data to the primary storage processor 210 (Step S210) and ends the data reading process of the secondary storage processor 240.

The recall requesting unit 215b of the primary storage processor 210 receives the data sent by the recall controller 246b of the secondary storage processor 240 (Step S211). The RAID controller 215d stores the data in the storage location of the hard disk $30_1$ through $30_L$ specified by the logical unit number and the logical unit logical block address (Step S212).

The primary storage virtual disk configuring unit 215a updates the primary storage mapping table 214a by storing the virtual disk number, the virtual disk logical block address, the logical unit number, the logical unit logical block address, the status, and the last accessed date in the primary storage mapping table 214a (Step S213).

Since the data stored on the hard disk $30_1$ through $30_L$ now exists both in the hard disk $30_1$ through $30_L$ and the magnetic tape $40_1$ through $40_M$ or the optical disk $50_1$ through $50_N$, the status of the data is set as 'Hit'. The last accessed date for the data would be the data on which the data is stored on the hard disk $30_1$ through $30_L$.

The RAID controller 215d then reads the data stored on the hard disk $30_1$ through $30_L$ (Step S214), and sends the data to the host server apparatus 10 (Step S215), thus ending the data reading process.

Figure 10:
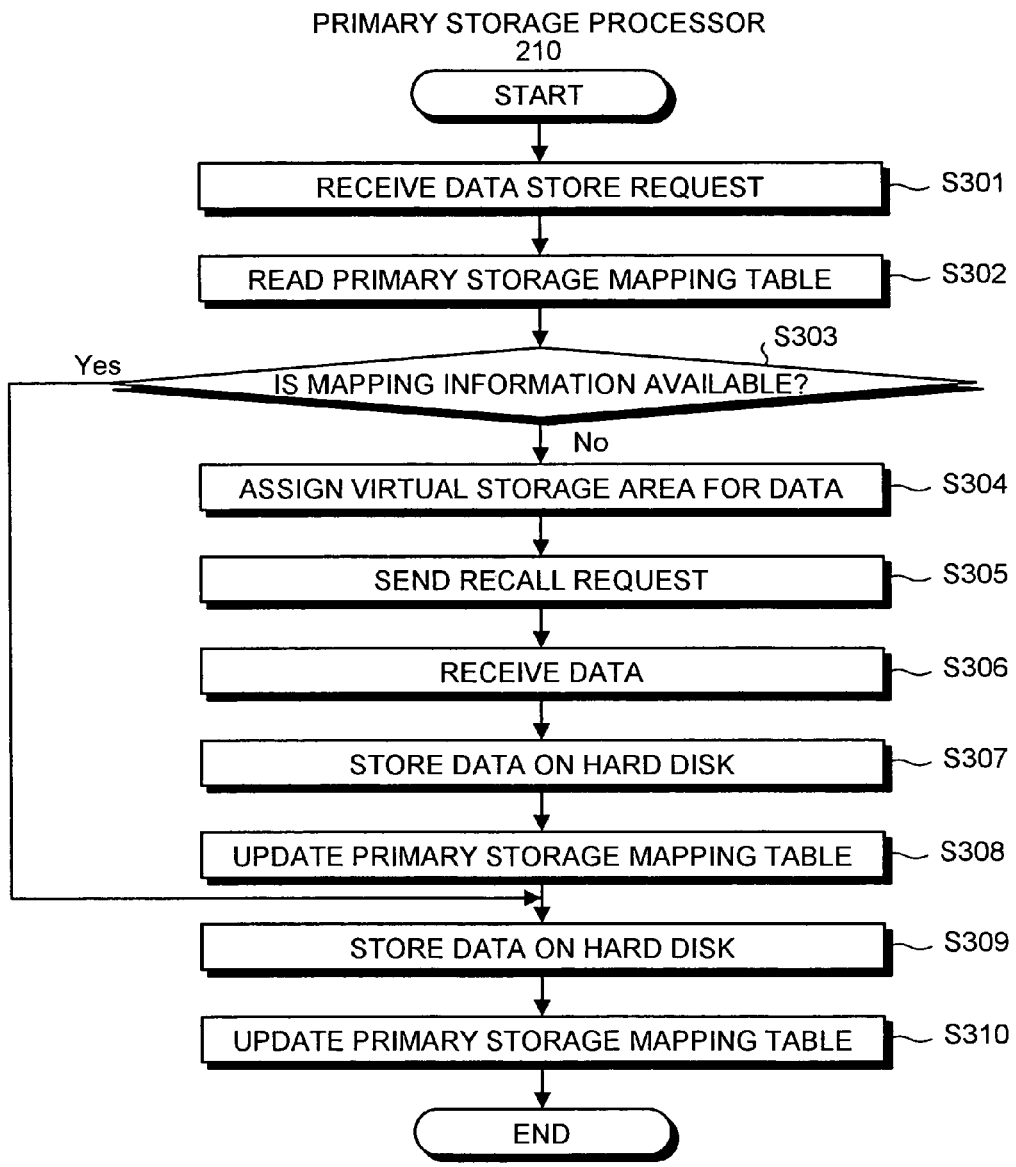
FIG. 10 is a flowchart of a data storing process performed by the storage apparatus 20 according to the first embodiment.

A data storing process performed by the storage apparatus 20 according to the first embodiment is explained next. FIG. 10 is a flowchart of the data storing process performed by the storage apparatus 20 according to the first embodiment.

The role of the secondary storage processor 240 in the data storing process is the same as that in the data reading process shown in FIG. 9 and hence is not described here.

Upon receiving a data store request from the host server apparatus 10 (Step S301), the primary storage virtual disk configuring unit 215a of the primary storage processor 210 of the storage apparatus 20 reads the primary storage mapping table 214a (Step S302).

The primary storage virtual disk configuring unit 215a then gets from the host server apparatus 10 the information pertaining to the virtual disk number and the virtual disk relative address of the virtual disk $60_1$ through $60_3$ in which the data is stored.

The primary storage virtual disk configuring unit 215a then determines whether the mapping information pertaining to the virtual disk $60_1$ through $60_3$ received from the host server apparatus 10 is stored in the primary storage mapping table 214a (Step S303).

Mapping information refers to information pertaining to correspondence of the virtual disk number and the virtual disk logical block address to the logical unit 100 and the logical unit logical block address.

If the mapping information is stored in the primary storage mapping table 214a ("Yes" at Step S303), the RAID controller 215d stores the data on the hard disk $30_1$ through $30_L$ of the hard disk device 213 based on the mapping information (Step S309).

The primary storage virtual disk configuring unit 215a then sets the status of the data stored on the hard disk $30_1$ through $30_L$ to 'Dirty' in the primary storage mapping table 214a and updates the primary storage mapping table 214a by updating the last accessed date (Step S310), thus ending the data storing process.

If the mapping information is not stored in the primary mapping table 214a ("No" at Step S303), the primary storage virtual disk configuring unit 215a assigns a virtual storage area in the virtual disk $60_1$ through $60_3$ for the data for which a data store request was received from the host server apparatus 10 (Step S304).

To be specific, the primary storage virtual disk configuring unit 215a assigns a logical unit number and a logical unit logical block address for the virtual disk logical block address specified by the virtual disk number and the virtual disk relative address of the virtual disk $60_1$ through $60_3$ notified by the host server apparatus 10.

The recall requesting unit 215b then sends the recall request to the secondary storage processor 240 (Step S305).

Upon receiving the recall request from the recall requesting unit 215b of the primary storage processor 210, the secondary storage processor 240 reads from the magnetic tape $40_1$ through $40_M$ or the optical disk $50_1$ through $50_N$ the data corresponding to the virtual disk number and the virtual disk logical block address of the data for which the data store request was made, and sends the read data to the recall requesting unit 215b of the primary storage processor 210. This process corresponds to Steps S205 through S209 in the flowchart shown in FIG. 9.

The recall request is made to the secondary storage processor 240 because the units in which the data is stored in the magnetic tape $40_1$ through $40_M$ or the optical disk $50_1$ through $50_N$ are different from the units in which the host server apparatus 10 makes the data store request.

To be specific, data is stored in units of MRB on the magnetic tape $40_1$ through $40_M$ or the optical disk $50_1$ through $50_N$. However, the host server apparatus 10 issues data store request in units smaller than MRB, thus also giving rise to situations where only partial modification is required for the data stored in one MRB.

If the data is stored only on the magnetic tape $40_1$ through $40_M$ or the optical disk $50_1$ through $50_N$ and not on the hard disk $30_1$ through $30_L$, it becomes necessary to read the data stored on the magnetic tape $40_1$ through $40_M$ and the optical disk $50_1$ through $50_N$ and partially modify the read data.

Therefore, in the storage apparatus 20, if the mapping information of the data to be stored is not found in the primary storage mapping table 214a, the data is read from the magnetic tape $40_1$ through $40_M$ or the optical disk $50_1$ through $50_N$ and stored on the hard disk $30_1$ through $30_L$.

If the data is also not stored on the magnetic tape $40_1$ through $40_M$ or the optical disk $50_1$ through $50_N$, the secondary storage processor 240 sends empty data, which is stored on the hard disk $30_1$ through $30_L$.

To return to FIG. 10, the recall requesting unit 215b of the primary storage processor 210 receives the data sent by the secondary storage processor 240 (Step S306). The RAID controller 215d then stores the data in the storage location of the hard disk $30_1$ through $30_L$ specified by the logical unit number and the logical unit logical block address (Step S307).

The primary storage virtual disk configuring unit 215a then updates the primary storage mapping table 214a by storing the virtual disk number, the virtual disk logical block address, the logical unit number, the logical unit logical block address, the status, and the last accessed data in the primary storage mapping table 214a (Step S308).

Since the data stored on the hard disk $30_1$ through $30_L$ now exists both in the hard disk $30_1$ through $30_L$ and the magnetic tape $40_1$ through $40_M$ or the optical disk $50_1$ through $50_N$, the status of the data is set as 'Hit'. The last accessed date for the data would be the data on which the data is stored on the hard disk $30_1$ through $30_L$.

The RAID controller 215d then stores the data requested by the host server apparatus 10 in the storage area of the hard disk $30_1$ through $30_L$ specified by the storage location of the data in the virtual disk number, the virtual disk logical block address and the logical block (Step S309).

The primary storage virtual disk configuring unit 215a sets the status of the data stored on the hard disk $30_1$ through $30_L$ as 'Dirty' in the primary storage mapping table 214a, and updates the primary storage mapping table 214a by updating the last accessed data (Step S310), thus ending the data storing process.

Thus, according to the first embodiment, the primary storage virtual disk configuring unit 215a and the secondary storage virtual disk configuring unit 246a of the storage apparatus 20 logically combine the storage areas of the hard disks $30_1$ through $30_L$ and the storage areas of the magnetic tapes $40_1$ through $40_M$ or the optical disks $50_1$ through $50_N$ to configure a plurality of virtual disks $60_1$ through $60_3$ having virtual storage areas. The migration requesting unit 215c and the migration controller 246c exert control in such a way as to store the data that is stored in the storage area of the hard disk $30_1$ through $30_L$ belonging to a predetermined virtual storage area, in the storage area of the magnetic tape $40_1$ through $40_M$ or the optical disk $50_1$ through $50_N$ belonging to the predetermined virtual storage area. Consequently, data can be distributed among the virtual storage areas. As a result, diverse data stored in the virtual storage areas can be easily and efficiently managed.

Further, according to the first embodiment, the storage location of the data in the virtual storage area notified by the host server apparatus 10 along with the data store request is translated to the storage location of the data in the storage area of the hard disk $30_1$ through $30_L$ and the storage location of the data in the storage area of the magnetic tape $40_1$ through $40_M$ or the optical disk $50_1$ through $50_N$ in the primary storage mapping table 214a and the secondary storage mapping table 245a. Based on the primary storage mapping table 214a and the secondary storage mapping table 245a, the migration requesting unit 215c and the migration controller 246c exert control in such a way as to store the data that is stored in the storage area of the hard disk $30_1$ through $30_L$ belonging to a predetermined virtual storage area, in the storage area of the magnetic tape $40_1$ through $40_M$ or the optical disk $50_1$ through $50_N$ belonging to the predetermined virtual storage area. Consequently, the storage location of the data can be efficiently identified with the aid of the primary storage mapping table 214a and the secondary storage mapping table 245a. As a result, diverse data stored in the virtual storage areas can be easily and efficiently managed.

Further, according to the first embodiment, if a certain data stored in the storage area of the hard disk $30_1$ through $30_L$ that belongs to a predetermined virtual storage area is not referred to by the host server apparatus 10 for a given period, the migration requesting unit 215c and the migration controller 246c exert control in such a way as to store the data in the storage area of the hard disk $30_1$ through $30_L$ in the storage area that belongs to the virtual storage area of the magnetic tape $40_1$ through $40_M$ or the optical disk $50_1$ through $50_N$. Consequently, data in each virtual storage area that is not referred to for long periods are automatically transferred to the magnetic tape $40_1$ through $40_M$ or the optical disk $50_1$ through $50_N$, facilitating an easy and efficient management of diverse data stored in the virtual storage areas.

Further, according to the first embodiment, after the data is stored in a storage area of the magnetic tape $40_1$ through $40_M$ or the optical disk $50_1$ through $50_N$ that belongs to a predetermined virtual storage area, the recall requesting unit 215b and the recall controller 246b exert control in such a way as to read the data stored in the storage area of the magnetic tape $40_1$ through $40_M$ or the optical disk $50_1$ through $50_N$ and stores the data in the storage area belonging to the virtual storage area of the hard disk $30_1$ through $30_L$. Consequently, the data in each virtual storage area that is transferred to the magnetic tape $40_1$ through $40_M$ or the optical disk $50_1$ through $50_N$ is automatically recalled back to the hard disk $30_1$ through $30_L$, facilitating easy and efficient management of diverse data stored in the virtual storage areas.

Further, according to the first embodiment, upon receiving a data read request for the data stored in the storage area of the magnetic tape $40_1$ through $40_M$ or the optical disk $50_1$ through $50_N$ from the host server apparatus 10, the data is read from the storage area of the magnetic tape $40_1$ through $40_M$ or the optical disk $50_1$ through $50_N$ and stored first in the storage area of the hard disk $30_1$ through $30_L$, and then sent to the host server apparatus 10. Consequently, the need for host server apparatus 10 to recognize the magnetic tape $40_1$ through $40_M$ or the optical disk $50_1$ through $50_N$ is obviated, facilitating easy and efficient data management.

Further, according to the first embodiment, the hard disks $30_1$ through $30_L$ are used as the primary storage 30. Consequently, the diverse data stored in the virtual storage areas can be easily and efficiently managed and the data exchange between the hard disks $30_1$ through $30_L$ and the host server apparatus 10 can be speeded up.

Further according to the first embodiment, the magnetic tapes $40_1$ through $40_M$ or the optical disks $50_1$ through $50_N$ are used as the first secondary storage 40 or the second secondary storage 50. Consequently, data can be easily and efficiently managed and large volumes of data can be stored.

According to the first embodiment, the user configures the virtual storage areas of the virtual disks $60_1$ through $60_3$ configured using the storage areas of the hard disks $30_1$ through $30_L$ and the magnetic tapes $40_1$ through $40_M$ or the optical disks $50_1$ through $50_N$. However, the virtual storage areas of the virtual disks $60_1$ through $60_3$ may also be automatically reconfigured by the storage apparatus 20 according to the free space available in the virtual storage areas.

Thus, even if no space is available in the virtual disk $60_1$ through $60_3$, storage capacity can be automatically increased by reconfiguring the virtual disk $60_1$ through $60_3$ and data storage can be carried out without a hitch. A second embodiment of the present invention concerns automatic reconfiguration of the virtual storage according to the availability of free space in the virtual storage areas of the virtual disks $60_1$ through $60_3$.

Figure 11:
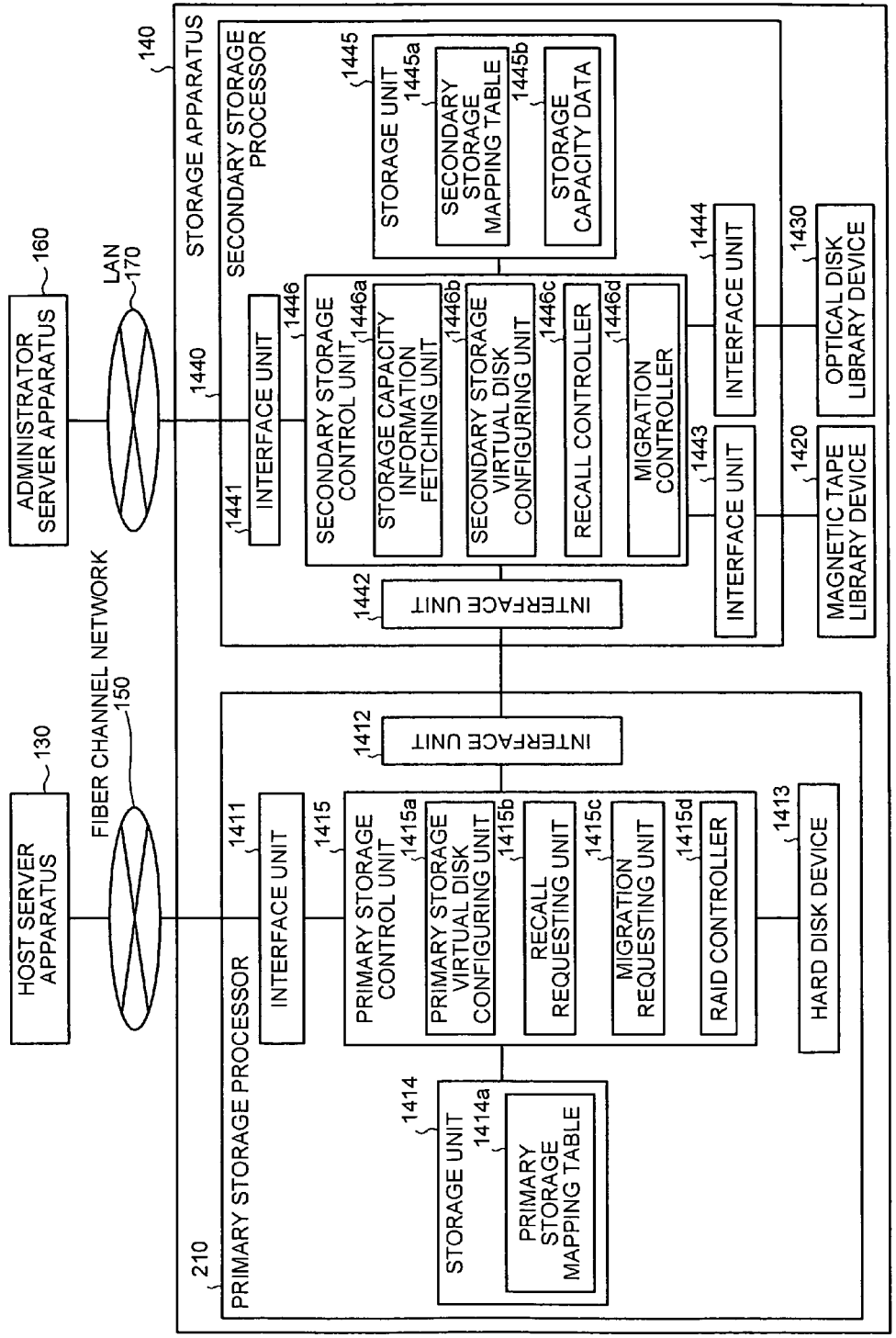
FIG. 11 is a functional configuration of a storage apparatus 140 according to a second embodiment of the present invention.

FIG. 11 is a functional configuration of a storage apparatus 140 according to the second embodiment. The functional units of the storage apparatus 140 according to the second embodiment that are identical to those of the storage apparatus 20 according to the first embodiment are not described again.

Functionally, the storage apparatus 140 is substantially similar to the storage apparatus 20 shown in FIG. 2. The difference lies in the point that when the free space in the virtual storage area of the virtual disk of the storage apparatus 140 dwindles, the storage areas of the magnetic tape $40_1$ through $40_M$ or the optical disks $50_1$ through $50_N$ are assigned to the virtual disks $60_1$ through $60_3$ to configure virtual storage areas of the virtual disks $60_1$ through $60_3$.

As shown in FIG. 11, the storage apparatus 140 is connected to a host server apparatus 130 via a fiber channel network 150 and to an administrator server apparatus 160 via a LAN 170. The host server apparatus 130 and the administrator server apparatus 160 respectively correspond to the host server apparatus 10 and the administrator server apparatus 80 shown in FIG. 2 and have the same functions.

The storage apparatus 140 includes a primary storage processor 1410, a magnetic tape library device 1420, an optical disk library device 1430, and a secondary storage processor 1440. The primary storage processor 1410 and the secondary storage processor 1440, the secondary storage processor 1440 and the magnetic tape library device 1420, as well as the secondary storage processor 1440 and the optical disk library device 1430 are respectively connected by a fiber channel circuit made of optical fiber.

The primary storage processor 1410 includes interface units 1411 and 1412, a hard disk device 1413, a storage unit 1414, and a primary storage control unit 1415. The interface units 1411 and 1412, and the hard disk device 1413 respectively correspond to the interface units 211 and 212, and the hard disk device 213 shown in FIG. 2 and have the same functions.

The storage unit 1414 corresponds to the storage unit 214 shown in FIG. 2 and stores a primary storage mapping table 1414a containing data similar to the primary storage mapping table 214a shown in FIG. 4.

The primary storage control unit 1415 corresponds to the primary storage control unit 215 shown in FIG. 2, and includes a primary storage virtual disk configuring unit 1415a, a recall requesting unit 1415b, a migration requesting unit 1415c, and a RAID controller 1415d.

The primary storage virtual disk configuring unit 1415a, the recall requesting unit 1415b, the migration requesting unit 1415c, and the RAID controller 1415d respectively correspond to the primary storage virtual disk configuring unit 215a, the recall requesting unit 215b, the migration requesting unit 215c, and the RAID controller 215d shown in FIG. 2 and have the same functions.

The magnetic tape library device 1420 and the optical disk library device 1430 respectively correspond to the magnetic tape library device 220 and the optical disk library device 230.

The secondary storage processor 1440 includes interface units 1441 through 1444, a storage unit 1445, and a secondary storage control unit 1446. The interface units 1441 through 1444 correspond to the interface units 241 through 244 shown in FIG. 2.

The storage unit 1445 is a storage device such as the hard disk device. The storage unit 1445 stores a secondary storage mapping table 1445a and a storage capacity data 1445b.

The secondary storage mapping table 1445a has data similar to that in the secondary storage mapping table 245a shown in FIG. 5. The storage capacity data 1445b stores the volume of the data stored in each of the virtual disks $60_1$ through $60_3$.

FIG. 12 is an example of the storage capacity data 1445b shown in FIG. 11. The storage capacity data 1445b includes information pertaining to the virtual disk number, the maximum storage capacity of the virtual disk $60_1$ through $60_3$, and data volume of the virtual disk $60_1$ through $60_3$.

The virtual disk number is identical to the virtual disk number stored in the primary storage mapping table 1414a and the secondary storage mapping table 1445a and is an identification number assigned to the virtual disk $60_1$ through $60_3$.

The maximum storage capacity is the maximum data storage capacity of each of the virtual disks $60_1$ through $60_3$. To be specific, the maximum storage capacity is a sum of the storage capacity of the magnetic tapes $40_1$ through $40_M$ or the optical disks $50_1$ through $50_N$ assigned to the virtual disk $60_1$ through $60_3$. The data volume is the volume of the data stored in the virtual disk $60_1$ through $60_3$.

In the example shown in FIG. 12, the virtual disk having a virtual disk number '0' has a maximum storage capacity of '512 GB' and a data volume of '389 GB'. Similarly, the virtual disk having a virtual disk number '1' has a maximum storage capacity of '1,024 GB' and a data volume of '947 GB'. The virtual disk having a virtual disk number '2' has a maximum storage capacity of '768 GB' and a data volume of '76.8 GB'.

To return to FIG. 11, the secondary storage control unit 1446 controls storing and reading of data by controlling the magnetic tape library device 1420 and the optical disk library device 1430.

The secondary storage control unit 1446 includes a storage capacity information fetching unit 1446a, a secondary storage virtual disk configuring unit 1446b, a recall controller 1446c, and a migration controller 1446d.

The storage capacity information fetching unit 1446a fetches the information pertaining to the storage capacity of the data stored in the virtual storage area of each of virtual disks $60_1$ through $60_3$ and stores the information as the storage capacity data 1445b in the storage unit 1445.

The storage capacity information fetching unit 1446a updates the storage capacity data 1445b every time data is stored in the virtual storage area of the virtual disk $60_1$ through $60_3$ configured from the storage areas of the magnetic tapes $40_1$ through $40_M$ or the optical disks $50_1$ through $50_N$.

The secondary storage virtual disk configuring unit 1446b receives the configuration information of the virtual disk $60_1$ through $60_3$ from the administrator server apparatus 160, and configures the virtual disk $60_1$ through $60_3$ by storing the configuration information in the secondary storing mapping table 1445a.

The secondary storage virtual disk configuring unit 1446b refers to the storage capacity data 1445b stored in the storage unit 1445 and checks for the virtual disk $60_1$ through $60_3$ in which a ratio of the data volume to the maximum storage capacity has exceeded a predetermined value.

If a virtual disk $60_1$ through $60_3$ is found in which the ratio of the data volume to the maximum storage capacity has exceeded the predetermined value, the secondary storage virtual disk configuring unit 1446b checks for the virtual disk $60_1$ through $60_3$ in which the ratio of the data volume to the maximum storage capacity is below the predetermined value and having unused MRBs that are not sandwiched between data-carrying MRBs.

If a virtual disk $60_1$ through $60_3$ is found in which the ratio of the data volume to the maximum storage capacity is below the predetermined value, the secondary storage virtual disk configuring unit 1446b assigns a part of the storage area of the magnetic tape $40_1$ through $40_M$ or the optical disk $50_1$ through $50_N$ of the virtual disk $60_1$ through $60_3$ having more space to the virtual disk $60_1$ through $60_3$ having less space, reconfiguring the virtual storage area of the virtual disk $60_1$ through $60_3$ having less space so as to increase its storage capacity.

The recall controller 1446c and the migration controller 1446d respectively correspond to the recall controller 246b and the migration controller 246c shown in FIG. 2 and have the same functions.

A reconfiguration process of the virtual storage area of the virtual disk $60_1$ through $60_3$ according to the second embodiment is explained next. FIG. 13 is a flowchart of the reconfiguration process of the virtual storage area of the virtual disk $60_1$ through $60_3$ according to the second embodiment.

The secondary storage virtual disk configuring unit 1446b of the storage apparatus 140 reads the storage capacity data 1445b from the storage unit 1445 (Step S401) and checks if any virtual disk $60_1$ through $60_3$ has the ratio of the data volume to the maximum storage capacity exceeding a predetermined value (Step S402).

If no virtual disk $60_1$ through $60_3$ has a storage capacity that exceeds the predetermined value ("No" at Step S402), the reconfiguration process of the virtual storage area ends there. If a virtual disk $60_1$ through $60_3$ having a storage capacity that exceeds the predetermined value is found ("Yes" at Step S402), the secondary storage virtual disk configuring unit 1446b checks for existence of any virtual disk $60_1$ through $60_3$ with the ratio of the data volume to the maximum storage capacity below the predetermined value and having unused logical blocks that are not sandwiched between data-carrying logical blocks (Step S403).

If no virtual disk $60_1$ through $60_3$ with the ratio of the storage capacity below the predetermined value and having unused logical blocks that are not sandwiched between data-carrying logical blocks is found ("No" at Step S403), the reconfiguration process of the virtual storage area ends there.

If a virtual disk $60_1$ through $60_3$ with the ratio of the storage capacity below the predetermined value and having unused logical blocks that are not sandwiched between data-carrying logical blocks is found ("Yes" at Step S403), the secondary storage virtual disk configuring unit 1446b releases the unused MRBs from the virtual disk $60_1$ through $60_3$ (Step S404).

To be specific, the secondary storage virtual disk configuring unit 1446b releases the unused MRBs by deleting from the secondary storage mapping table 1445a the information pertaining to the unused MRBs, that is, the removable media number, the removable media block number and the library number, that is stored correlated to the virtual disk number and the virtual disk logical block address.

The secondary storage virtual disk configuring unit 1446b then assigns the released unused MRBs to the virtual disk $60_1$ through $60_3$ with the storage capacity exceeding the predetermined value (Step S405), thus ending the reconfiguration process of the virtual storage area.

To be specific, the secondary storage virtual disk configuring unit 1446b stores in the secondary storage mapping table 1445a the information pertaining to the unused MRBs, that is, the removable media number, the removable media block number, and the library number, correlated to the virtual disk number and the virtual disk logical block address of the virtual disk $60_1$ through $60_3$ with the ratio of the storage capacity exceeding the predetermined value.

In the reconfiguration process of the virtual storage area described above, the unused logical blocks that are not sandwiched between the data-carrying logical blocks are assigned to the virtual disk $60_1$ through $60_3$ having insufficient storage capacity. However, the data stored in the logical blocks sandwiching the unused block can be stored in another logical block with the aid of the host server apparatus 130, and a bigger logical block than the original unused block may be made available.

Thus, according to the second embodiment, the storage capacity information fetching unit 1446a of the storage apparatus 140 gets information pertaining to the data storage capacity of the plurality of virtual storage areas. The secondary storage virtual disk configuring unit 1446b reconfigures the virtual storage areas based on the information fetched by the storage capacity information fetching unit 1446a. The migration requesting unit 1415c and the migration controller 1446d exert control in such a way as to store the data stored in the storage area of the hard disk $30_1$ through $30_L$ belonging to a predetermined reconfigured virtual storage area, in the storage area of the magnetic tape $40_1$ through $40_M$ or the optical disk $50_1$ through $50_N$ belonging to the predetermined virtual storage area. Consequently, the diverse data stored in the virtual storage areas can be easily and efficiently managed by reconfiguring the virtual storage space having insufficient free space.

According to the second embodiment, the storage area of the magnetic tape $40_1$ through $40_M$ or the storage area of the optical disk $50_1$ through $50_N$ that is being used as one virtual disk $60_1$ through $60_3$ is assignable to another virtual disk $60_1$ through $60_3$. The storage capacity of the virtual disk $60_1$ through $60_3$ may also be increased by pooling together the storage areas of the magnetic tapes $40_1$ through $40_M$ or the optical disks $50_1$ through $50_N$ beforehand, and adding the storage areas of the magnetic tapes $40_1$ through $40_M$ or the optical disks $50_1$ through $50_N$ to the storage area of the virtual disk $60_1$ through $60_3$ with insufficient storage capacity.

Alternatively, the magnetic tape $40_1$ through $40_M$ or the optical disk $50_1$ through $50_N$ may be respectively added to the magnetic tape library device 1420 or the optical disk library device 1430 in the event of occurrence of insufficiency of storage space in the virtual disk $60_1$ through $60_3$. In other words, the storage area of the magnetic tape $40_1$ through $40_M$ or the optical disk $50_1$ through $50_N$ may added to the storage area of the virtual disk $60_1$ through $60_3$ at the stage after the storage space in the virtual disk $60_1$ through $60_3$ becomes insufficient.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the present embodiment can be, entirely or in part, carried out manually. Similarly, all the manual processes explained in the present embodiment can be entirely or in part carried out automatically by a known method. The sequence of processes, the sequence of controls, specific names, and data including various parameters can be changed as required unless otherwise specified.

The processes, the control processes, specific names, the various data and parameters mentioned in the text or shown in the drawings may be modified unless otherwise specified.

The constituent elements of the apparatus illustrated are merely conceptual and may not necessarily physically resemble the structures shown in the drawings. For instance, the apparatus need not necessarily have the structure that is illustrated. The apparatus as a whole or in parts can be broken down or integrated either functionally or physically in accordance with the load or how the device is to be used.

The process functions performed by the apparatus are entirely or partially realized by the CPU or a program executed by the CPU or by a hardware using wired logic.

According to the present invention, storage areas of a primary storage and a secondary storage are logically combined to configure a plurality of virtual storage areas. Control is exerted in such a way as to store the data stored in the storage area of the primary storage belonging to a predetermined virtual storage area, in the storage area of the secondary storage belonging to the predetermined virtual storage area. Consequently, data can be categorized and stored in different virtual storage areas, thereby enabling easy and efficient management of diverse data.

According to the present invention, a storage location of data in the virtual storage area notified along with a data read request by a host computer is translated to a storage location of the data in the storage area of the primary storage and the storage location of the data in the storage area of a secondary storage. Based on this translation information, control is exerted in such a way as to store the data stored in the storage area of the primary storage belonging to a predetermined virtual storage area, in the storage area of the secondary storage belonging to the predetermined virtual storage area. Consequently, the storage location of the data can be efficiently identified using the translation information, and the diverse data stored in the virtual storage areas can be easily and effectively managed.

According to the present invention, if any data stored in the storage area of the primary storage belong to a predetermined virtual storage area is not referred to by the host computer for a given duration, control is exerted in such a way as to store the data stored in the storage area of the primary storage in the storage area of the secondary storage belonging to the predetermined virtual storage area. Consequently, data not referred to for long periods are automatically transferred to the secondary storage from each virtual storage area, facilitating easy and efficient management of diverse data.

According to the present invention, after data is stored in the storage area of the secondary storage belonging to a predetermined virtual storage area, the data can be read from the storage area of the secondary storage and recalled to the storage area of the primary storage belonging to the predetermined virtual storage area. Consequently, data transferred to the secondary storage can be automatically recalled to the primary storage, facilitating easy and efficient management of diverse data.

According to the present invention, upon reception of a data read request to read the data stored in the storage area of the secondary storage, the data is read from the storage area of the secondary storage into the storage area of the primary storage and then sent to the host computer. Consequently, the need for the host computer to recognize the secondary storage is obviated, facilitating easy and efficient data management.

According to the present invention, information pertaining to the storage capacity of the plurality of virtual storage areas is fetched, and the virtual storage areas are reconfigured based on the information. Control is exerted in such a way as to store the data stored in the storage area of the primary storage belonging to a predetermined reconfigured virtual storage area, in the storage area of the secondary storage belonging to the predetermined virtual storage area. Consequently, when the storage capacity of any virtual storage area dwindles, the relevant virtual storage area can be reconfigured to accommodate data, facilitating easy and efficient management of diverse data.

According to the present invention, hard disks are used as the primary storage. Consequently, the diverse data stored in the virtual storage areas can be easily and efficiently managed, and the data exchange between the primary storage and the host computer can be speeded up.

According to the present invention, magnetic tapes or optical disks are used as the secondary storage. Consequently, the diverse data stored in the virtual storage areas can be easily and efficiently managed, and the data exchange between the primary storage and large volumes of data can be stored.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A hierarchical storage apparatus comprising:
   a secondary storage unit that stores data in a second storage area;
   a primary storage unit that temporarily stores data in a first storage area, the data being exchanged between a host computer and the secondary storage unit;
   a virtual-storage-area setting unit that logically combines a portion of the first storage area and a portion of the second storage area to set a virtual storage area; and
   a data-storage control unit that sends the data stored in the virtual storage area to the host computer, when the data stored in the virtual storage area is requested by the host computer, wherein
   upon receiving a request to read the data stored in the virtual storage area from the host computer, the data-storage control unit reads the data from the portion of the first storage area belonging to the virtual storage area if the data requested is found in the portion of the first storage area belonging to the virtual storage area, and sends the data read to the host computer, and
   the data-storage control unit moves the data stored in the first storage area to the second storage area when the data is not referred to by the host computer for a predetermined period of time.

2. The hierarchical storage apparatus according to claim 1, wherein the data-storage control unit controls the data storage based on a primary storage mapping table and a secondary mapping table, wherein
   the primary storage mapping table stores a correspondence between a virtual storage area logical block address and a first storage area logical block address, and the secondary mapping table stores a correspondence between a virtual storage area logical block address and a second storage area logical block address.

3. The hierarchical storage apparatus according to claim 2, wherein
   the primary storage mapping table further stores a status that indicates whether the data corresponding to the first storage area logical block address is modified or not after the data is stored in the first storage area, and
   the data-storage control unit moves the data stored in the first storage area to the second storage area if the data is not referred to by the host computer for a predetermined time and the status corresponding to the first storage area logical block address of the data indicates that the data is modified after the data is stored in the first storage area.

4. The hierarchical storage apparatus according to claim 1, further comprising a data-return control unit that controls the data storage in such a manner that the data is read from the second storage area belonging to the predetermined virtual storage area, and stored in the first storage area belonging to the predetermined virtual storage area, upon receiving the request to read the data from the host computer after the data is moved to the second storage area belonging to the predetermined virtual storage area.

5. The hierarchical storage apparatus according to claim 4, further comprising a data transmitting unit that transmits, upon receiving the request to read the data stored in the predetermined virtual storage area from the host computer, the data stored in the first storage area by the data-return control unit to the host computer.

6. The hierarchical storage apparatus according to claim 1, further comprising a data-capacity-information acquiring unit that acquires information pertaining to data storage capacity of the virtual storage area, wherein
   the virtual-storage-area setting unit expands the size of the portion of the second storage area belonging to the virtual storage area based on the information acquired by the data-capacity-information acquiring unit.

7. The hierarchical storage apparatus according to claim 1, wherein the primary storage unit comprises a hard disk.

8. The hierarchical storage apparatus according to claim 1, wherein the secondary storage unit comprises a magnetic tape and/or an optical disk.

9. A storage control method of controlling data storage of a hierarchical storage apparatus that includes a secondary storage unit that stores data in a second storage area, and a primary storage unit that stores data exchanged between a host computer and the secondary storage unit in a first storage area temporarily, the storage control method comprising:
   setting a virtual storage area by logically combining a portion of the first storage area and a portion of the second storage area; and
   controlling the data storage in such a manner that the data stored in the virtual storage area is sent to the host computer, when the data stored in the virtual storage area is requested by the host computer, wherein
   upon receiving a request to read the data stored in the virtual storage area from the host computer, the apparatus reads the data from the portion of the first storage area belonging to the virtual storage area if the data requested is found in the portion of the first storage area belonging to the virtual storage area, and sends the data read to the host computer, and
   the controlling includes moving the data stored in the first storage area to the second storage area when the data is not referred to by the host computer for a predetermined period of time.

10. The storage control method according to claim 9, wherein the controlling includes controlling the data storage based on a primary storage mapping table and a secondary mapping table, wherein
   the primary storage mapping table stores a correspondence between a virtual storage area logical block address and a first storage area logical block address, and the secondary mapping table stores a correspondence between the virtual storage area logical block address and a secondary storage area logical block address.

11. The storage control method according to claim 10, wherein
the primary storage mapping table further stores a status that indicates whether the data corresponding to the first storage area logical block address is modified or not after the data is stored in the first storage area, and
the controlling includes moving the data stored in the first storage area to the second storage area if the data is not referred to by the host computer for a predetermined time and the status corresponding to the first storage area logical block address of the data indicates that the data is modified after the data is stored in the first storage area.

12. The storage control method according to claim 9, further comprising returning the data, in such a manner that the data is read from the second storage area belonging to the predetermined virtual storage area, and stored in the first storage area belonging to the predetermined virtual storage area, upon receiving the request to read the data from the host computer after the data is moved to the second storage area belonging to the predetermined virtual storage area.

13. The storage control method according to claim 12, further comprising transmitting, upon receiving the request to read the data stored in the predetermined virtual storage area from the host computer, the data stored in the first storage area to the host computer.

14. The storage control method according to claim 9, further comprising:
acquiring information pertaining to data storage capacity of the virtual storage area; and
expanding the size of the portion of the second storage area belonging to the virtual storage area based on the information acquired at the acquiring.

15. The storage control method according to claim 9, wherein the primary storage unit comprises a hard disk.

16. The storage control method according to claim 9, wherein the secondary storage unit comprises a magnetic tape and/or an optical disk.

17. A computer-readable recording medium that stores a computer program for controlling data storage of a hierarchical storage apparatus that includes a secondary storage unit that stores data in a second storage area, and a primary storage unit that stores data exchanged between a host computer and the secondary storage unit in a first storage area temporarily, wherein the computer program makes a computer execute the process comprising:
setting a virtual storage area by logically combining a portion of the first storage area and a portion of the second storage area; and
controlling the data storage in such a manner that the data stored in the virtual storage area is sent to the host computer, when the data stored in the virtual storage area is requested by the host computer, wherein
upon receiving a request to read the data stored in the virtual storage area from the host computer, the apparatus reads the data from the portion of the first storage area belonging to the virtual storage area if the data requested is found in the portion of the first storage area belonging to the virtual storage area, and sends the data read to the host computer, and
the controlling includes moving the data stored in the first storage area to the second storage area when the data is not referred to by the host computer for a predetermined period of time.

18. A storage apparatus comprising:
a primary storage unit;
a secondary storage unit; and
a virtual-storage-area setting unit that logically combines a portion of the primary storage unit and a portion of the secondary storage unit to set a virtual storage area, the primary and secondary storage units being configured in a hierarchy, and upon receiving a request from a host computer to retrieve data from the virtual storage area, the data is sent from the primary storage unit to the host computer, and unretrieved data stored in the primary storage unit is transferred to the secondary storage unit when the unretrieved data is not referred to by a host computer for a predetermined period of time.

19. A hierarchical storage apparatus for transferring data between a host computer and a virtual storage disk, comprising:
a primary storage unit;
a secondary storage unit;
a virtual-storage-area setting unit that logically combines the primary storage unit and the secondary storage unit to create a virtual storage disk; and
a data-storage control unit that manages a transfer of data between a host computer and the virtual storage disk, wherein
upon receiving a request from the host computer to retrieve data from the virtual storage disk, the data-storage control unit translates the location of the requested data in the virtual storage disk to the location of the data in the primary storage unit or the secondary storage unit, and when the request data is located in the primary storage unit, the data is sent from the primary storage unit to the host computer, and when the data is located in the secondary storage unit, the data is first transferred to the primary storage unit and then the data is sent from the primary storage unit to the host computer, and
the data-storage control unit transfers data stored in the primary storage unit to the secondary storage unit when the data is not retrieved by the host computer after a predetermined period of time.

20. The hierarchical storage apparatus accordingly to claim 19, further comprising:
a primary storage mapping table; and
a secondary storage mapping table, wherein
the primary storage mapping table stores a correspondence between a virtual storage disk logical block address and a logical unit logical block address, and the secondary storage mapping table stores a correspondence between a virtual storage disk logical block address and a secondary storage unit block address.

* * * * *